US012600305B1

(12) United States Patent
Willenborg et al.

(10) Patent No.: US 12,600,305 B1
(45) Date of Patent: Apr. 14, 2026

(54) UNDERSEAT AIR COMPRESSOR SYSTEM

(71) Applicant: Owl Vans, LLC, Mesa, AZ (US)

(72) Inventors: John Willenborg, Paradise Valley, AZ (US); Chris Lewis, Surprise, AZ (US)

(73) Assignee: Owl Vans, LLC, Mesa, AZ (US)

( * ) Notice: Subject to any disclaimer, the term of this patent is extended or adjusted under 35 U.S.C. 154(b) by 0 days.

(21) Appl. No.: 19/043,923

(22) Filed: Feb. 3, 2025

(51) Int. Cl.
| | |
|---|---|
| *B60R 11/00* | (2006.01) |
| *B60C 23/00* | (2006.01) |
| *B60C 23/10* | (2006.01) |
| *B60R 16/02* | (2006.01) |
| *B60R 16/033* | (2006.01) |

(52) U.S. Cl.
CPC .............. *B60R 11/00* (2013.01); *B60C 23/10* (2013.01); *B60R 16/0207* (2013.01); *B60R 16/033* (2013.01); *B60C 23/001* (2013.01); *B60R 2011/0012* (2013.01); *B60R 2011/005* (2013.01)

(58) Field of Classification Search
CPC ................... B60R 11/00; B60R 16/033; B60R 2011/0012; B60R 2011/005; B60C 23/10
USPC .................................................. 296/63, 1.07
See application file for complete search history.

(56) References Cited

U.S. PATENT DOCUMENTS

2020/0406736 A1* 12/2020 Hattori ..................... B60N 2/68

FOREIGN PATENT DOCUMENTS

| | | | | |
|---|---|---|---|---|
| CN | 87102781 | * | 11/1988 | |
| CN | 105314041 | * | 6/2020 | |
| FR | 3124152 A1 | * | 12/2022 | ............... B60K 1/04 |

OTHER PUBLICATIONS

FR3124152 Text (Year: 2022).*
CN105314041 Text (Year: 2020).*
CN87102781 Text (Year: 1988).*
Agile Offroad, Web Page—ARB Twin Onboard Air Kit for INEOS Grenadier by Agile Offroad Retrieved from the Internet: https://agileoffroad.com/product/arb-twin-onboard-air-kit-for-ineos-grenadier-by-agile-offroad/, 4 pages, Nov. 4, 2024.
Desert Does It, Web Page—Under seat Compressor (2009-2024 RAM Truck) Retrieved from the Internet: https://desertdoesit.com/products/under-seat-compressor-mount-2009-2024-ram-truck?variant=39622228443218&country=US&currncy=USD&utm_medium=product_sync&utm_source=google&utm_content=sag_organic&utm_campaign=sag_organic&gad_source=1&gclid=Cj0KCQiA57G5BhDUARIsACgCYnwgRSN_iAYkmRnOfQF-cYv7qPfss73kGaE-N9fLk2bcAfTc2DvGFGoaAoeVEALw_wcB, 4 pages, Nov. 7, 2024.
Desert Does It., Web Page—Under Seat Compressor mount (2005-2023 TACOMA, 2003-2024 4RUNNER, 2007-2014 FJ Cruiser, 2010-2023 LX460) Retrieved from the Internet: https://desertdoesit.com/products/under-seat-air-compressor-mount-2005-2021-toyota-tacoma-2003-2021-4runner?srsltid=AfmBOorYO1AkRd2efdvypLvz1aZZsjVRvMuM2gO2Mk-dEJzPIYEOOhVn, 4 pages, Nov. 7, 2024.

(Continued)

*Primary Examiner* — Amy R Weisberg
(74) *Attorney, Agent, or Firm* — Woodard, Emhardt, Henry, Reeves & Wagner, LLP

(57) ABSTRACT

An under-seat compressor system has been developed to provide a convenient way to adjust tire pressure in a vehicle. The system includes a mounting bracket that mounts to a crossmember under the seat in the vehicle. The mounting bracket is designed to secure an air compressor under the seat of the vehicle without discarding or replacing of any seat fasteners used to secure the seat to the vehicle. In one form, the air compressor is powered by an Energy Storage System (ESS), such as a battery, located towards the rear of the vehicle. A wire harness, which is routed under the floor lining, connects the air compressor to the ESS.

34 Claims, 17 Drawing Sheets

(56) References Cited

OTHER PUBLICATIONS

Desert Does It, Web Page—under Seat Compressor Mount (2018-2024) Jeep Wrangler JLI, & Gladiator Retrieved from the Internet: https://desertdoesit.com/products/under-seat-compressor-mount-2018-2024-jeep-wrangler-jlu-gladiator?variant=40936221540434&country=US&currncy=USD&utm_medium=product_sync&utm_source=google&utm_content=sag_organic&utm_campaign=sag_organic&gad_source=1&gclid=Cj0KCQiA57G5BhDUARIsACgCYnyrEJZa93IS5.

American Adventure Lab, Web Page—Under Seat Mount—ARB Dual Compressor Kit Retrieved from the Internet: https://americanadventurelab.com/product/seat-mount-arb-dual-compressor-kit/?srsltid=AfmBOor3XshtZdhH0Ev5KGyMf0j0XF0vJtqS3ZwgdL4MHixr8-EU7DyH, 7 pages, Nov. 7, 2024.

Ineos Grenadier, Installation Guide Agile Offroad Smarter Than Dirt® INEOS Grenadier On-Board Compressor Kit Retrieved from the Internet: https://agileoffroad.com/wp-content/uploads/2024/02/AGA3001-Instructions2-compressed.pdf, 11 pages, Feb. 1, 2024.

Mule Expedition Outfitters, ARB Single Compressor Bracket Kit for INEOS Grenadier Retrieved from the Internet: https://dasmule.com/products/arb-ckma12-bracket-kit-for-ineos-grenadier?variant=46062825668840&gad_source=1&gad_campaignid=21061079974&gclid=Cj0KCQjw5onGBhDeARIsAFK6QJbyRM0HsLJ309gB-hCUPQMdglsJdVxzsLmk5zCLHUuH7iSSvLmlq30aAgnzEALw_wcB, 4 pages, Jul. 25, 2024.

Ineos Grenadier, YouTube Video Ineos Grenadier TJM x CATuned Offroad on board air (OBA) review Retrieved from the Internet: https://www.youtube.com/watch?v=OARfdWqe48Y, 1 page, Aug. 12, 2024.

Agile Offroad, Instagram Post: How clean are these ARB Twin Onboard Air Kits? Retrieved from the Internet: https://www.instagram.com/p/DBfFI9yIVfz/, 1 page, Oct. 23, 2024.

Agile Offroad, ARB Onboard Air Kit for INEOS Grenadier by Agile Offroad Retrieved from the Internet: https://agileoffroad.com/product/arb-onboard-air-kit-for-ineos-grenadier-by-agile-offroad/?gad_source=1&gad_campaignid=18461670954&gclid=Cj0KCQjw5onGBhDeARIsAFK6QJb3PkoufDxvLozCd3TsQs9-https://agileoffroad.com/product/arb-onboard-air-kit-for-ineos-grenadier-by-agile-offroad/?gad_source=1&gad_campaignid=18461670954, 3 pages, Jul. 7, 2025.

* cited by examiner 112    306    125    130

305    112    135    155

512

112    306    514    515    505    520    510    525    504

112    514    305    515    110    520    525    502

150      1410      1405      1325      1315

1510        1505        1320        1310

UNDERSEAT AIR COMPRESSOR SYSTEM

BACKGROUND

Having adequate tire pressure in tires of vehicles is always a concern. In off-road driving, it is quite common for drivers to deflate or otherwise reduce tire pressure to enhance traction when driving on sand, loose dirt, or other rough terrain. However, when it is time to drive home from off-roading, the low tire pressure is usually inadequate for driving on paved roads. Having low tire pressures can for example negatively impact vehicle braking, handling, fuel efficiency, and tire wear. While drivers can reinflate the tires with portable hand or electric pumps, such portable pumps can sometimes be forgotten or lost. In some cases, such when the pump is not properly secured during off-road driving, the pump may be damaged or even injure vehicle passengers.

Thus, there is a need for improvement in this field.

SUMMARY

A unique air compressor system and retrofit kit for a vehicle has been developed to address the above-mentioned as well as other issues. In one example, the air compressor system is permanently installed in a vehicle, such as a Grenadier® 4×4 vehicle manufactured by INEOS Automotive Limited, as an aftermarket kit or product. Permanently installing the air compressor in the vehicle at a known location alleviates the issues associated with a lost or forgotten air pump. As will be explained below, the air compressor kit is designed to simplify installation, provide a clean appearance when installed, and enhance safety when retrofitted to an existing vehicle. In other cases, the air compressor system can be installed in the vehicle by the original equipment manufacturer (OEM) during initial assembly of the vehicle.

The air compressor kit is typically mounted inside a cabin of the vehicle. Having the air compressor installed within the cabin of the vehicle helps to protect the compressor from the outside elements, such as water, dust, wind, and the like, which in turn reduces wear, corrosion, or other damage to the components of the compressor system. To conserve passenger space as well as to further protect the air compressor and promote safety, the air compressor system is installed underneath a seat in the vehicle. Having the compressor located under the seat lowers the center of mass of the vehicle and places the compressor at a location where the passenger is less likely to be seriously impacted by the compressor during an accident. In most install cases, the hose coupler for the air compressors faces outwards towards a door of the vehicle. When the door is opened, the hose is able to be readily connected to the air compressor. In most cases, the air compressor system is mounted under the driver's seat, but the air compressor system in other cases can be mounted under other seats of the vehicle such as under a front or back passenger seat. With the air compressor system mounted under the driver's seat, the driver of the vehicle is able to quickly and conveniently access the compressor. This allows the driver to readily connect the hose to the compressor and inflate the tires of the vehicle. While the air compressor system will be described as generally used to inflate tires, it should be recognized that the compressed air from the compressor can be used to perform other activities. For instance, the compressed air can be used to operate pneumatic tools and inflate balls like basketballs and footballs. Moreover, the air compressor in some cases can be used to pressurize other gases besides air.

When retrofitted to a vehicle, the air compressor system is in the form of a kit that generally includes a mounting bracket, an air compressor, and a wiring harness. The air compressor is attached to the mounting bracket, and the mounting bracket is used to mount the air compressor underneath the seat. The mounting bracket is shaped and configured to fit and orient the air compressor in the tight space underneath the seat with minimal impact to the seat and vehicle. The bracket is designed to securely mount the compressor to the vehicle without modifying pre-existing vehicle hardware and/or require additional fasteners, adhesives, or the like. Cutting, drilling, and/or removal of vehicle hardware is also not required. It was found that incorporating additional non-OEM rated hardware may create safety concerns. For instance, securing the compressor to the vehicle with aftermarket bolts may not be sufficient for surviving government mandated crash tests as the aftermarket bolts may be prone to shearing during a crash. Likewise, drilling, cutting, and/or removing vehicle hardware can create similar concerns.

In some higher performance vehicle designs, the floor of the vehicle has seat towers that rise above the floor, and the seats are attached to the floor of the vehicle at the seat towers. Commonly, the seat towers contain mounting points for mounting the seat hardware via one or more bolts or other fasteners. In some versions of these vehicles, like in the Grenadier® 4×4 vehicle, a seat support bracket or crossmember spans across the seat towers. While not certain, it is theorized that the crossmember is designed to enhance vehicle safety by providing additional stiffness and/or structural reinforcement between the seat towers. The crossmember is not directly connected to the seat so as to avoid interfering with the attachment of the seat to the vehicle.

To avoid creating safety concerns through the removal of the crossmember, the mounting bracket is designed to mount the air compressor to the vehicle with the crossmember remaining in place. In particular, the mounting bracket is designed to secure the compressor to the seat crossmember of the vehicle by using the pre-existing OEM fasteners such as bolts. The mounting bracket for the compressor is solely secured to the vehicle through this crossmember. This configuration eliminates the issues associated with sandwiching the mounting bracket between the seat and the seat towers. For safety purposes, the seat needs to be firmly secured to the vehicle. It was found that placing a bracket or other structure between the seat and the seat towers reduces the threaded engagement of the bolts to the seat towers. The length of the bolts received in the tower or seat may be insufficient such that stripping of the bolt threads or shearing of the bolts may occur. This arrangement may also change the seat position such that the seat may be too high or otherwise improperly positioned. It was also discovered that changing seat positioning could negatively impact the safety features of the vehicle, such as seatbelt alignment and airbag deployment.

In the air compressor system, the mounting bracket has one or more mounting holes located to match the locations where at least some of the OEM bolts or other fasteners are used to secure the crossmember. With this design of the mounting bracket, the same preexisting OEM bolts that secure the seat bar to the vehicle are used to secure the mounting bracket and air compressor to the vehicle. By utilizing the preexisting OEM fasteners on the crossmember, the system mitigates safety risks associated with altering the fasteners that secure the seat bar. During a crash, the seat can apply significant torque to the bolts that mount the seat to the vehicle due to the weight of the passenger and the seat as well as the moment arm length between the seat and the mounting location. With these significant potential torques, it was again found that securing the full length of the bolts to the vehicle was helpful. In contrast, the crossmember is relatively light and does not extend far from the seat towers when mounted such that the bolts for the crossmember normally will experience less torque and other similar forces during a crash. While the OEM bolts mounting the crossmember to the seat towers are slightly recessed from the seat towers, it was found this should not cause significant safety concerns with respect to bolt shearing or thread stripping. The mounting holes are defined in a series of flanges arranged at different angles such that the mounting bracket is secured to different parts of the crossmember and at differing angles. In other words, the mounting bracket attaches to the crossmember on multiple planes so as to provide flexibility and stability. In most cases, the mounting bracket is attached to the crossmember that is located at the front facing side of the seat. With the crossmember located at the front of the seat, the crossmember can further brace the compressor such as during sudden stops.

In one version, the mounting bracket is made of aluminum. In other examples, the mounting bracket can be made of but not limited to steel, titanium, or other metallic and non-metallic materials. In one example, the mounting bracket includes multiple surfaces that serve different functions including, but not limited to securing to the crossmember, securing the air compressor, and providing user accessible services. In one example, the mounting bracket includes cut-outs for accommodating a switch and a hose coupler. The switch allows the user to activate and deactivate the air compressor from an accessible location. The hose coupler is connected to the air compressor, and the hose coupler serves as an accessible connection point for a hose used to inflate the wheels of the tire or supply pressurized air for other purposes.

Power for operating the compressor in one example is supplied by an Energy Storage System (ESS), such as an electric battery, connected via a wire harness. The ESS in one form is a car battery such as a 12- or 24-volt (V) battery. This configuration utilizes the existing electrical system of the vehicle to provide a convenient power source for the air compressor. The air compressor is directly connected to the battery, with the voltage requirements of the air compressor matched to the output of the battery to ensure efficient operation without overloading the system. In one form, the air compressor receives power through a direct connection to the positive terminal on the battery and is grounded to the chassis of the vehicle, ensuring reliable operation of the compressor. In one version, the wire harness electrically connects the compressor to the positive terminal on the battery and a ground terminal of the vehicle. When installed, the harness is routed under the seat towards the rear of the vehicle. Aftermarket electrical accessories often require routing electrical wiring through a firewall of the vehicle to connect to the battery, further complicating installation. This process can be intricate and time-consuming, and if not executed properly, it may compromise the electrical system of the vehicle by introducing potential hazards such as short circuits, electrical fires, or even engine fires. Maneuvering the wiring through the existing space also requires careful attention to avoid interference with the current electrical setup of the vehicle.

In one example, the air compressor is a dual air compressor. In other examples, the air compressor may be a single air compressor. Dual air compressors offer significant advantages over a single compressor when it comes to filling tires, particularly in terms of efficiency and speed. By employing two compressors, the system can deliver a greater volume of air at a faster rate, effectively reducing the time it takes to inflate a tire. The increased air flow can be particularly beneficial in scenarios where multiple tires need to be inflated quickly, such as in off-road environments where tire pressures are frequently adjusted. Additionally, dual compressors can provide redundancy. If one compressor experiences a failure, the other can continue to operate, ensuring that that inflation process is not entirely halted. This reliability can be helpful in remote or demanding settings where timely tire inflation is needed to maintain vehicle performance and safety. Furthermore, dual air compressors often distribute the workload, minimizing wear and tear on each unit, which can extend the lifespan of the system and reduce maintenance needs.

The systems and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a vehicle.

Aspect 3 generally concerns the system of any previous aspect including a seat.

Aspect 4 generally concerns the system of any previous aspect including a floor.

Aspect 5 generally concerns the system of any previous aspect including one or more seat towers.

Aspect 6 generally concerns the system of any previous aspect in which the seat towers are configured to support the seat.

Aspect 7 generally concerns the system of any previous aspect in which the seat and the seat towers define a seat cavity.

Aspect 8 generally concerns the system of any previous aspect in which the seat, the floor, and the seat towers define the seat cavity.

Aspect 9 generally concerns the system of any previous aspect in which the seat cavity is located underneath the seat.

Aspect 10 generally concerns the system of any previous aspect in which the seat towers include a console facing seat tower.

Aspect 11 generally concerns the system of any previous aspect in which the seat towers include a door facing tower.

Aspect 12 generally concerns the system of any previous aspect in which the vehicle has a door.

Aspect 13 generally concerns the system of any previous aspect in which the vehicle has a door opening.

Aspect 14 generally concerns the system of any previous aspect including an Energy Storage System (ESS).

Aspect 15 generally concerns the system of any previous aspect in which the vehicle has an Energy Storage System (ESS).

Aspect 16 generally concerns the system of any previous aspect in which the ESS includes a battery.

Aspect 17 generally concerns the system of any previous aspect in which the vehicle has a vehicle cabin.

Aspect 18 generally concerns the system of any previous aspect in which the ESS is stored in the vehicle cabin.

Aspect 19 generally concerns the system of any previous aspect in which the ESS is stored under the floor of the vehicle cabin.

Aspect 20 generally concerns the system of any previous aspect in which the ESS is a car battery.

Aspect 21 generally concerns the system of any previous aspect in which the ESS is stored under a passenger seat.

Aspect 22 generally concerns the system of any previous aspect in which the passenger seat is a rear passenger seat.

Aspect 23 generally concerns the system of any previous aspect in which the passenger seat is located on the driver side of the vehicle.

Aspect 24 generally concerns the system of any previous aspect including a crossmember.

Aspect 25 generally concerns the system of any previous aspect in which the crossmember extends between seat towers.

Aspect 26 generally concerns the system of any previous aspect in which the crossmember extends between the console facing seat tower and the door facing seat tower.

Aspect 27 generally concerns the system of any previous aspect in which the crossmember is L-Shaped.

Aspect 28 generally concerns the system of any previous aspect in which the crossmember is an angle beam.

Aspect 29 generally concerns the system of any previous aspect in which the crossmember has a web and a leg.

Aspect 30 generally concerns the system of any previous aspect in which the leg extends transverse to the web.

Aspect 31 generally concerns the system of any previous aspect in which the leg extends perpendicular to the web.

Aspect 32 generally concerns the system of any previous aspect including one or more crossmember fasteners securing the crossmember to the seat towers.

Aspect 33 generally concerns the system of any previous aspect in which the crossmember fasteners are bolts.

Aspect 34 generally concerns the system of any previous aspect in which the crossmember is secured with the crossmember fasteners to the seat towers by an Original Equipment Manufacturer (OEM) of the vehicle.

Aspect 35 generally concerns the system of any previous aspect in which the crossmember fasteners include one or more leg fasteners.

Aspect 36 generally concerns the system of any previous aspect in which the leg fasteners are configured to secure the leg of the crossmember to the seat towers.

Aspect 37 generally concerns the system of any previous aspect in which the crossmember fasteners include one or more web fasteners.

Aspect 38 generally concerns the system of any previous aspect in which the web fasteners are configured to secure the web of the crossmember to the seat towers.

Aspect 39 generally concerns the system of any previous aspect in which the crossmember fasteners include one or more base fasteners.

Aspect 40 generally concerns the system of any previous aspect in which the base fasteners are configured to secure the web of the crossmember to the seat towers.

Aspect 41 generally concerns the system of any previous aspect in which the leg fasteners and the web fasteners extend transverse to one another when securing the crossmember to the seat towers.

Aspect 42 generally concerns the system of any previous aspect in which transverse includes perpendicular.

Aspect 43 generally concerns the system of any previous aspect in which the leg fasteners and the base fasteners extend transverse to one another when securing the crossmember to the seat towers.

Aspect 44 generally concerns the system of any previous aspect in which the vehicle has one or more tires.

Aspect 45 generally concerns the system of any previous aspect in which the seat is a drivers seat.

Aspect 46 generally concerns the system of any previous aspect in which the crossmember is positioned towards the front of the vehicle under the seat.

Aspect 47 generally concerns the system of any previous aspect including a kit.

Aspect 48 generally concerns the system of any previous aspect including an air compressor kit.

Aspect 49 generally concerns the system of any previous aspect including an air compressor.

Aspect 50 generally concerns the system of any previous aspect in which the air compressor is configured to create pressurized gas.

Aspect 51 generally concerns the system of any previous aspect in which the air compressor is a dual air compressor.

Aspect 52 generally concerns the system of any previous aspect in which the air compressor has an outlet.

Aspect 53 generally concerns the system of any previous aspect including an air line connected to the air compressor.

Aspect 54 generally concerns the system of any previous aspect including an elbow connecting the air compressor to the air line.

Aspect 55 generally concerns the system of any previous aspect in which the elbow is bent to facilitate mounting of the air compressor under the seat.

Aspect 56 generally concerns the system of any previous aspect including a hose coupler.

Aspect 57 generally concerns the system of any previous aspect in which the air line connects the hose coupler to the air compressor.

Aspect 58 generally concerns the system of any previous aspect including a hose.

Aspect 59 generally concerns the system of any previous aspect in which the hose coupler is configured to detachably couple to a hose.

Aspect 60 generally concerns the system of any previous aspect in which the hose is configured to supply the pressurized gas from the compressor.

Aspect 61 generally concerns the system of any previous aspect in which the air compressor is configured to inflate a tire of the vehicle via the hose.

Aspect 62 generally concerns the system of any previous aspect in which the pressurized gas includes air.

Aspect 63 generally concerns the system of any previous aspect including a switch.

Aspect 64 generally concerns the system of any previous aspect in which the switch is configured to turn the air compressor on and off.

Aspect 65 generally concerns the system of any previous aspect in which the switch is operatively connected to the air compressor.

Aspect 66 generally concerns the system of any previous aspect including a switch cable electrically connecting the switch to the air compressor.

Aspect 67 generally concerns the system of any previous aspect including a wire harness.

Aspect 68 generally concerns the system of any previous aspect in which the wire harness is configured to supply electrical power from an Energy Storage System (ESS) of the vehicle to the air compressor.

Aspect 69 generally concerns the system of any previous aspect in which the wire harness electrically connects the air compressor to the ESS.

Aspect 70 generally concerns the system of any previous aspect in which the wire harness includes a positive wire and a ground wire.

Aspect 71 generally concerns the system of any previous aspect in which the battery has a positive terminal and a negative terminal.

Aspect 72 generally concerns the system of any previous aspect in which the positive wire connects to a positive terminal.

Aspect 73 generally concerns the system of any previous aspect in which the vehicle has a ground point.

Aspect 74 generally concerns the system of any previous aspect in which the ground wire connects to a ground point.

Aspect 75 generally concerns the system of any previous aspect in which the wire harness electrically connects the air compressor to the ESS without routing through a firewall of the vehicle.

Aspect 76 generally concerns the system of any previous aspect in which the wire harness extends within the vehicle cabin of the vehicle.

Aspect 77 generally concerns the system of any previous aspect in which the wire harness extends in a rearward direction from the air compressor to the rear passenger seat.

Aspect 78 generally concerns the system of any previous aspect in which the wire harness has a length that is sufficient to electrically connect the air compressor to the ESS when the ESS is located behind the seat where the air compressor is mounted.

Aspect 79 generally concerns the system of any previous aspect in which the wire harness has a length that is sufficient to electrically connect the air compressor to the ESS when the ESS is located in the vehicle cabin of the vehicle.

Aspect 80 generally concerns the system of any previous aspect including a mounting bracket.

Aspect 81 generally concerns the system of any previous aspect in which the mounting bracket is configured to mount the air compressor to the vehicle.

Aspect 82 generally concerns the system of any previous aspect in which the mounting bracket is configured to mount the air compressor under a seat of a vehicle.

Aspect 83 generally concerns the system of any previous aspect in which the mounting bracket is configured to mount in the seat cavity.

Aspect 84 generally concerns the system of any previous aspect in which the mounting bracket mounts the air compressor inside the seat cavity.

Aspect 85 generally concerns the system of any previous aspect in which the mounting bracket is configured to mount the air compressor to a crossmember located under the seat.

Aspect 86 generally concerns the system of any previous aspect in which the air compressor is mounted to the mounting bracket.

Aspect 87 generally concerns the system of any previous aspect in which the mounting bracket has a base plate.

Aspect 88 generally concerns the system of any previous aspect in which the air compressor is mounted to the base plate of the mounting bracket.

Aspect 89 generally concerns the system of any previous aspect in which the base plate defines one or more compressor mounting holes.

Aspect 90 generally concerns the system of any previous aspect including one or more compressor fasteners extending through the compressor mounting holes to secure the air compressor to the base plate.

Aspect 91 generally concerns the system of any previous aspect including one or more compressor fasteners configured to be received in the compressor mounting holes to secure the air compressor to the base plate of the mounting bracket.

Aspect 92 generally concerns the system of any previous aspect in which the mounting bracket has a cover plate.

Aspect 93 generally concerns the system of any previous aspect in which the cover plate extends transverse to the base plate.

Aspect 94 generally concerns the system of any previous aspect in which the cover plate faces a door opening when the mounting bracket is mounted.

Aspect 95 generally concerns the system of any previous aspect in which the cover plate covers a space between the seat towers to shield the air compressor.

Aspect 96 generally concerns the system of any previous aspect in which the switch is mounted to the cover plate.

Aspect 97 generally concerns the system of any previous aspect in which the switch faces the door opening.

Aspect 98 generally concerns the system of any previous aspect in which the hose coupler is mounted to the cover plate.

Aspect 99 generally concerns the system of any previous aspect in which the hose coupler faces the door opening to promote convenient hose connection.

Aspect 100 generally concerns the system of any previous aspect in which the mounting bracket is fastened to the cross member using the crossmember fasteners that fasten the crossmember to the seat towers.

Aspect 101 generally concerns the system of any previous aspect in which the mounting bracket defines one or more crossmember mounting holes configured to receive the crossmember fasteners that fasten the crossmember to the vehicle.

Aspect 102 generally concerns the system of any previous aspect in which the crossmember mounting holes are positioned on the mounting bracket to match the locations where at least some of the crossmember fasteners fasten the crossmember to the vehicle.

Aspect 103 generally concerns the system of any previous aspect in which the mounting bracket has a crossmember plate.

Aspect 104 generally concerns the system of any previous aspect in which the crossmember plate extends transversely from the base plate.

Aspect 105 generally concerns the system of any previous aspect in which the mounting bracket has a flange.

Aspect 106 generally concerns the system of any previous aspect in which the flange extends transversely from the crossmember plate.

Aspect 107 generally concerns the system of any previous aspect in which the crossmember plate is disposed between the base plate and the flange.

Aspect 108 generally concerns the system of any previous aspect in which the flange and the base plate extend parallel relative to one another.

Aspect 109 generally concerns the system of any previous aspect in which the crossmember plate widens from the base plate to form opposing wings proximal to the flange.

Aspect 110 generally concerns the system of any previous aspect in which the mounting bracket is secured to the crossmember at two different planes to enhance security of the air compressor.

Aspect 111 generally concerns the system of any previous aspect in which the crossmember plate has at least some of the crossmember mounting holes.

Aspect 112 generally concerns the system of any previous aspect in which the flange has at least some of the crossmember mounting holes.

Aspect 113 generally concerns the system of any previous aspect in which the crossmember plate and the flange both have the crossmember mounting holes.

Aspect 114 generally concerns the system of any previous aspect in which the flange is secured to the leg of the crossmember.

Aspect 115 generally concerns the system of any previous aspect in which the crossmember plate is secured to the web of the crossmember.

Aspect 116 generally concerns the system of any previous aspect in which the crossmember mounting holes include at least one base fastener hole defined in the crossmember plate.

Aspect 117 generally concerns the system of any previous aspect in which the mounting bracket defines a relief hole.

Aspect 118 generally concerns the system of any previous aspect in which the relief hole is sized to receive a head of a bolt.

Aspect 119 generally concerns the system of any previous aspect in which the relief hole is defined in the crossmember plate at a location opposite to the base fastener hole.

Aspect 120 generally concerns the system of any previous aspect in which the crossmember mounting holes include one or more web fastener holes.

Aspect 121 generally concerns the system of any previous aspect in which the web fastener holes are defined in the crossmember plate.

Aspect 122 generally concerns the system of any previous aspect in which the web fastener holes are defined in the wings of the crossmember plate.

Aspect 123 generally concerns the system of any previous aspect in which the crossmember mounting holes include one or more flange holes.

Aspect 124 generally concerns the system of any previous aspect in which the flange holes are defined at the corners of the flange.

Aspect 125 generally concerns the system of any previous aspect in which the mounting bracket is secured to the crossmember located at the front of the seat to brace the air compressor during deceleration.

Aspect 126 generally concerns the system of any previous aspect in which the air compressor extends along the longitudinal axis of the vehicle.

Aspect 127 generally concerns the system of any previous aspect in which the compressors of the dual air compressor extend on opposite sides of the seat.

Aspect 128 generally concerns the system of any previous aspect in which the crossmember fasteners originally installed by an Original Equipment Manufacturer (OEM) fasten the mounting bracket to the crossmember.

Aspect 129 generally concerns the system of any previous aspect in which the mounting bracket defines one or more crossmember mounting holes.

Aspect 130 generally concerns the system of any previous aspect including one or more crossmember fasteners extending through the crossmember mounting holes to secure the mounting bracket to the crossmember.

Aspect 131 generally concerns the system of any previous aspect in which the drivers seat is located on the left side of the vehicle.

Aspect 132 generally concerns the system of any previous aspect in which the drivers seat is located on the right side of the vehicle.

Aspect 133 generally concerns the system of any previous aspect in which the seat is located inside a vehicle cabin of a vehicle with a floor.

Aspect 134 generally concerns a method.

Aspect 135 generally concerns the method of any previous aspect including securing an air compressor to a mounting bracket.

Aspect 136 generally concerns the method of any previous aspect including placing the mounting bracket in a seat cavity that is define underneath a seat of a vehicle.

Aspect 137 generally concerns the method of any previous aspect including mounting the mounting bracket to a crossmember that extends between seat towers where the seat is secured.

Aspect 138 generally concerns the method of any previous aspect including removing one or more cross member fasteners that are used to secure the crossmember to the seat towers.

Aspect 139 generally concerns the method of any previous aspect including placing the mounting bracket against the crossmember with crossmember holes in the mounting bracket aligned with corresponding mount openings in the crossmember where the crossmember fasteners are secured.

Aspect 140 generally concerns the method of any previous aspect in which the mounting includes fastening the mounting bracket to the crossmember with the crossmember fasteners.

Aspect 141 generally concerns the method of any previous aspect including connecting a wire harness to the air compressor.

Aspect 142 generally concerns the method of any previous aspect including running the wire harness within a vehicle cabin of the vehicle.

Aspect 143 generally concerns the method of any previous aspect including connecting the wire harness to an Energy Storage System (ESS) of the vehicle.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
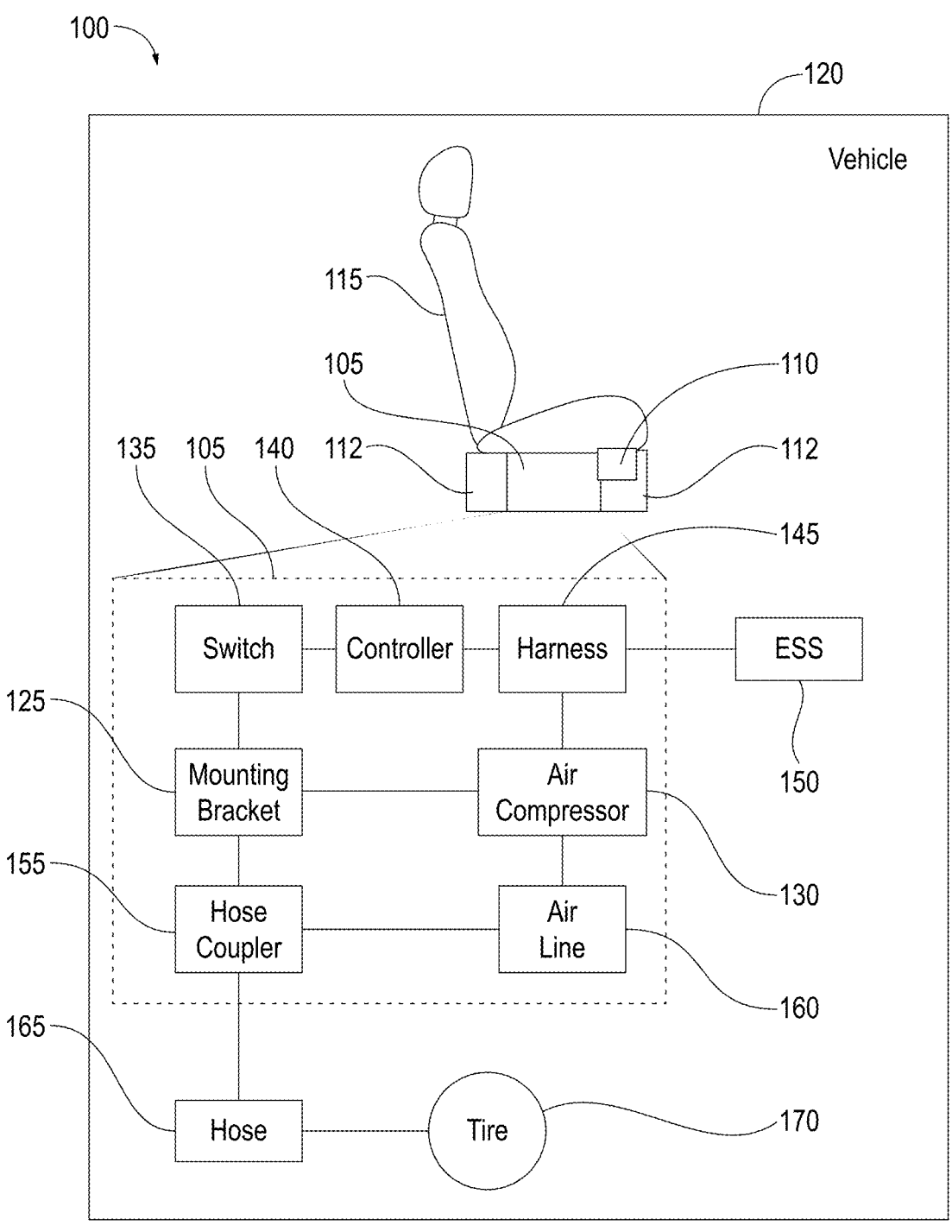
FIG. 1 is a block diagram of an air compressor system for a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a block diagram of a unique under seat air compressor system 100. The system 100 generally includes a compressor kit 105 that is configured to mount to a crossmember 110. The crossmember 110 spans across and connects a pair of seat towers 112. One or more of the seat towers 112 support a seat 115 of a vehicle 120. The seat towers 112 extend from a floor of the vehicle 120, and the seat 115 is secured to the seat towers 112 via bolts or other types of fasteners. The compressor kit 105 is mounted to the crossmember 110 at a location that is under the seat 115 of the vehicle 120. The mounting of the compressor kit 105 to the crossmember 110 reduces any safety risks associated with the use of the bolts that secure the seat 115 to the seat towers 112. The compressor kit 105 is located underneath the seat 115 between the front and back seat towers 112. In the illustrated example, the compressor kit 105 is mounted to the crossmember 110 that extends between the seat towers

112 at the front of the seat 115. This configuration helps to further brace the compressor kit 105 during sudden braking or deceleration.

The compressor kit 105 includes a mounting bracket 125 that mounts to the crossmember 110 with the use of the existing fasteners on the crossmember 110. The compressor kit 105 further includes an air compressor 130 that is mounted to the mounting bracket 125. The air compressor 130 takes air from the surrounding environment and compresses the air to be used for inflation. In one example, the air compressor 130 is activated and deactivated by the user with the use of a switch 135 mounted on the mounting bracket 125. A controller 140 is connected to the switch 135 and a wire harness 145. The air compressor 130 receives power from an Energy Storage System (ESS) 150, such as an electrical battery, for the vehicle 120. The ESS 150 is connected to the air compressor 130 via the wire harness 145. When the switch 135 is activated, the controller 140 allows power to be sent from the ESS 150 to the air compressor 130.

In one example, a hose coupler 155 is mounted to the mounting bracket 125. The hose coupler 155 is connected to the air compressor 130 via an air line 160. The hose coupler 155 allows a user, such as a driver of the vehicle 120, to detachably couple a hose 165 to the air compressor 130. The hose 165 can then be connected to a tire 170 of the vehicle 120. The user can fill up the tire 170 with air when the air compressor 130 is activated. Additionally, a pressure gauge in one example is coupled to the hose 165 to provide a pressure reading for the tire 170.

Figure 2:
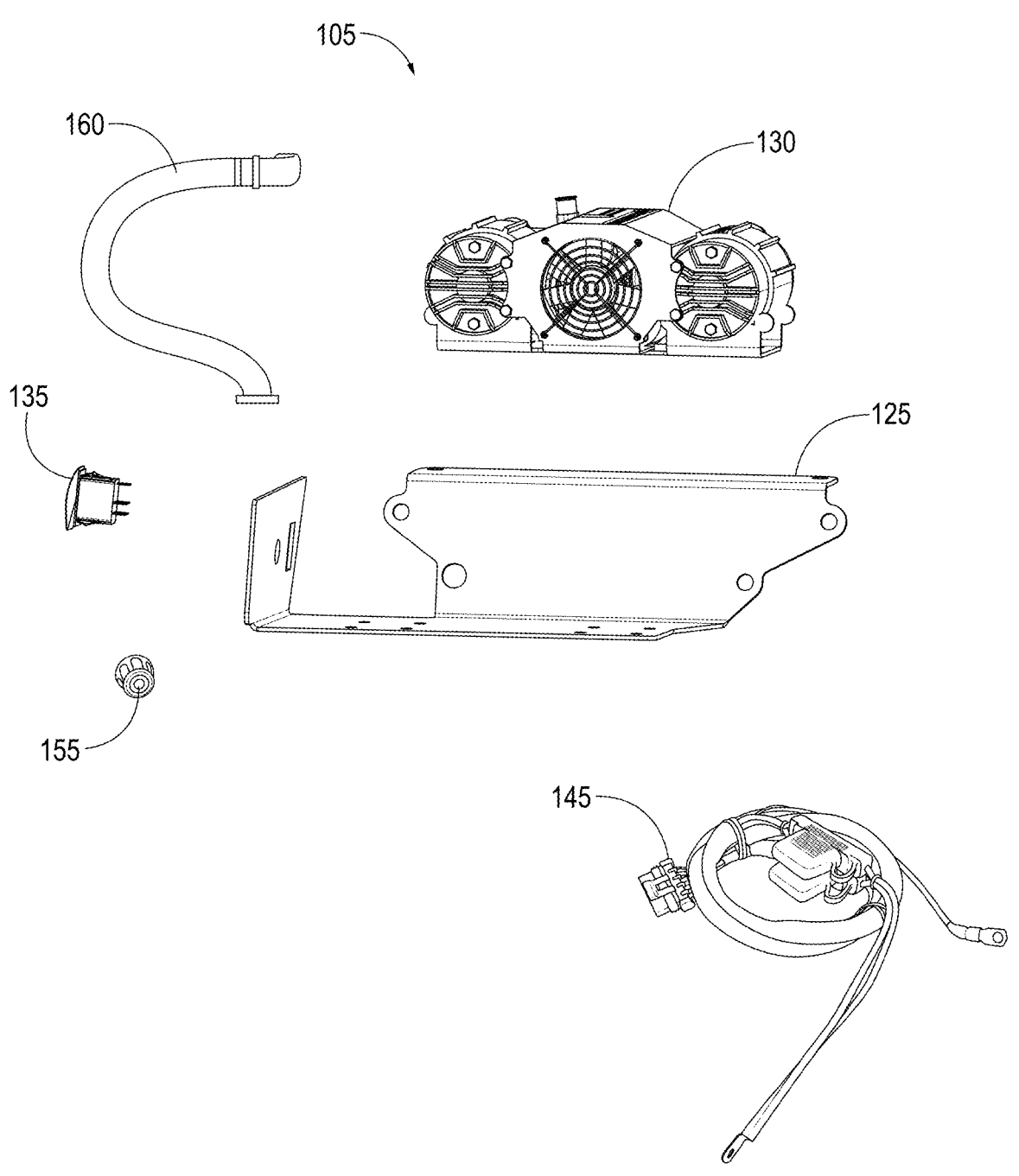
FIG. 2 is an exploded view of a compressor kit of the FIG. 1 system.

FIG. 2 illustrates an exploded view of the compressor kit 105 according to one example. Once more, the mounting bracket 125 is configured to mount to the crossmember 110 of the vehicle 120. The air compressor 130 in turn is mounted to the mounting bracket 125. The air compressor 130 is mounted to the vehicle 120 through the mounting bracket 125. The switch 135 and the hose coupler 155 are mounted on one side of the mounting bracket 125 that faces outwards from the side of the seat 115. In other words, the switch 135 and the hose coupler 155 face a door opening of the vehicle 120 when the compressor kit 105 is mounted underneath the seat 115. The air line 160 fluidly connects the air compressor 130 to the hose coupler 155. The wire harness 145 electrically connects the air compressor 130 to the ESS 150 of the vehicle 120.

Figure 3:
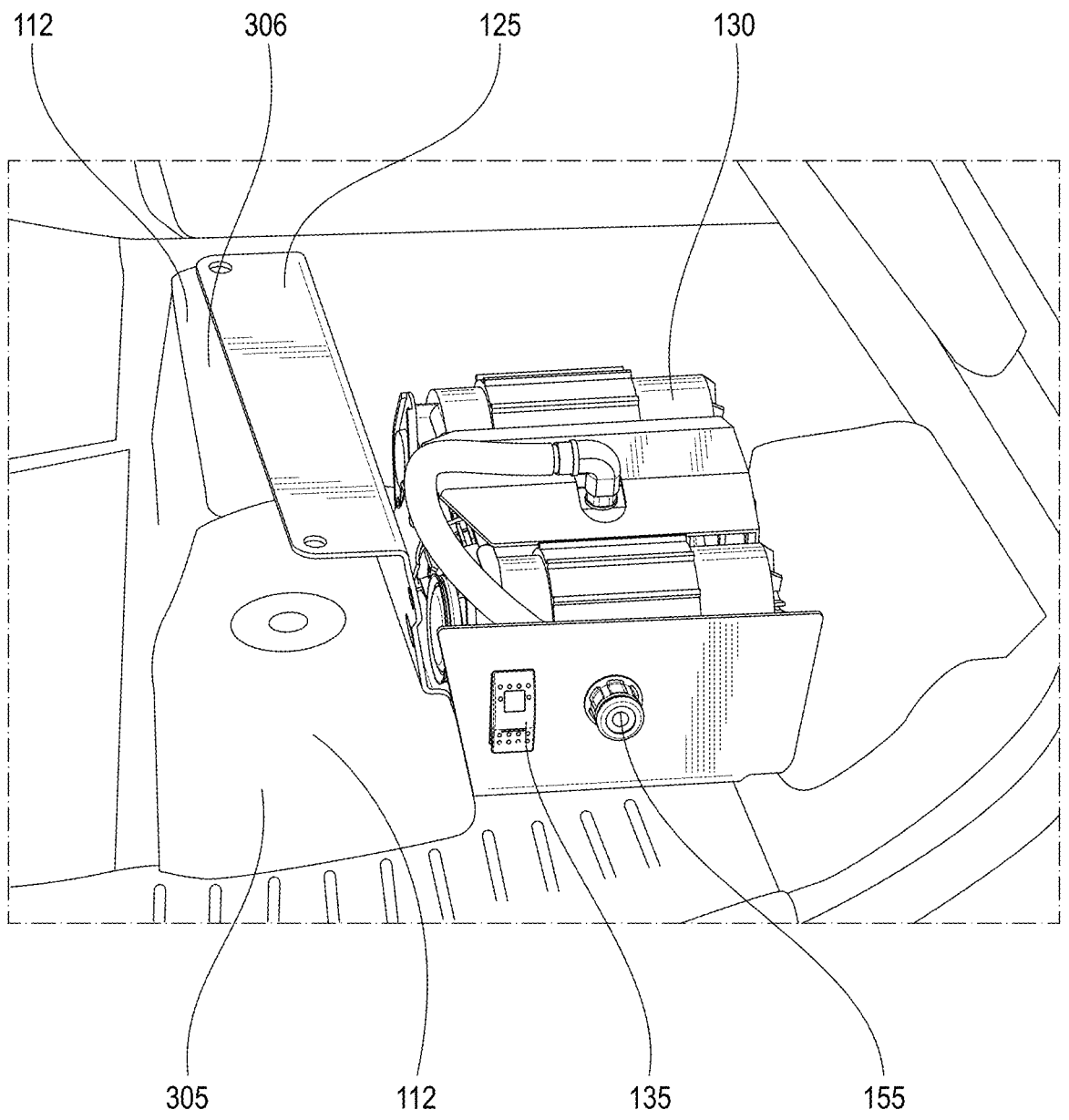
FIG. 3 is a perspective view of the compressor kit mounted under a seat of the vehicle.

FIG. 3 illustrates a perspective view of the compressor kit 105 mounted to the crossmember 110 under the seat 115 of the vehicle 120. In this example, the compressor kit 105 is mounted under the driver seat of the vehicle 120. The compressor kit 105 occupies the space under the seat 115 that is typically an unused space in the vehicle 120. In the illustrated example, the seat towers 112 include a door facing seat tower 305 and a console facing seat tower 306. The door facing seat tower 305 is positioned proximal to the door opening for the door of the vehicle 120. The console facing seat tower 306 is located proximal to the central longitudinal axis of the vehicle 120 where a center console or driveshaft tunnel of the vehicle 120 is typically located. The crossmember 110 is mounted to the door facing seat tower 305 and the console facing seat tower 306. The door facing seat tower 305 and door facing seat tower 305 are aligned along a lateral axis that is generally transverse to the longitudinal axis of the vehicle 120. Once more, the door facing seat tower 305 is positioned closer to the nearest door than the console facing seat tower 306. The crossmember 110 extends between the door facing seat tower 305 and the console facing seat tower 306. In one example, the crossmember 110 is mounted to the door facing seat tower 305 and console facing seat tower 306 on multiple surfaces of the seat towers 112. The mounting bracket 125 mounts to the crossmember 110 on the same multiple surfaces of the crossmember 110.

Figure 4:
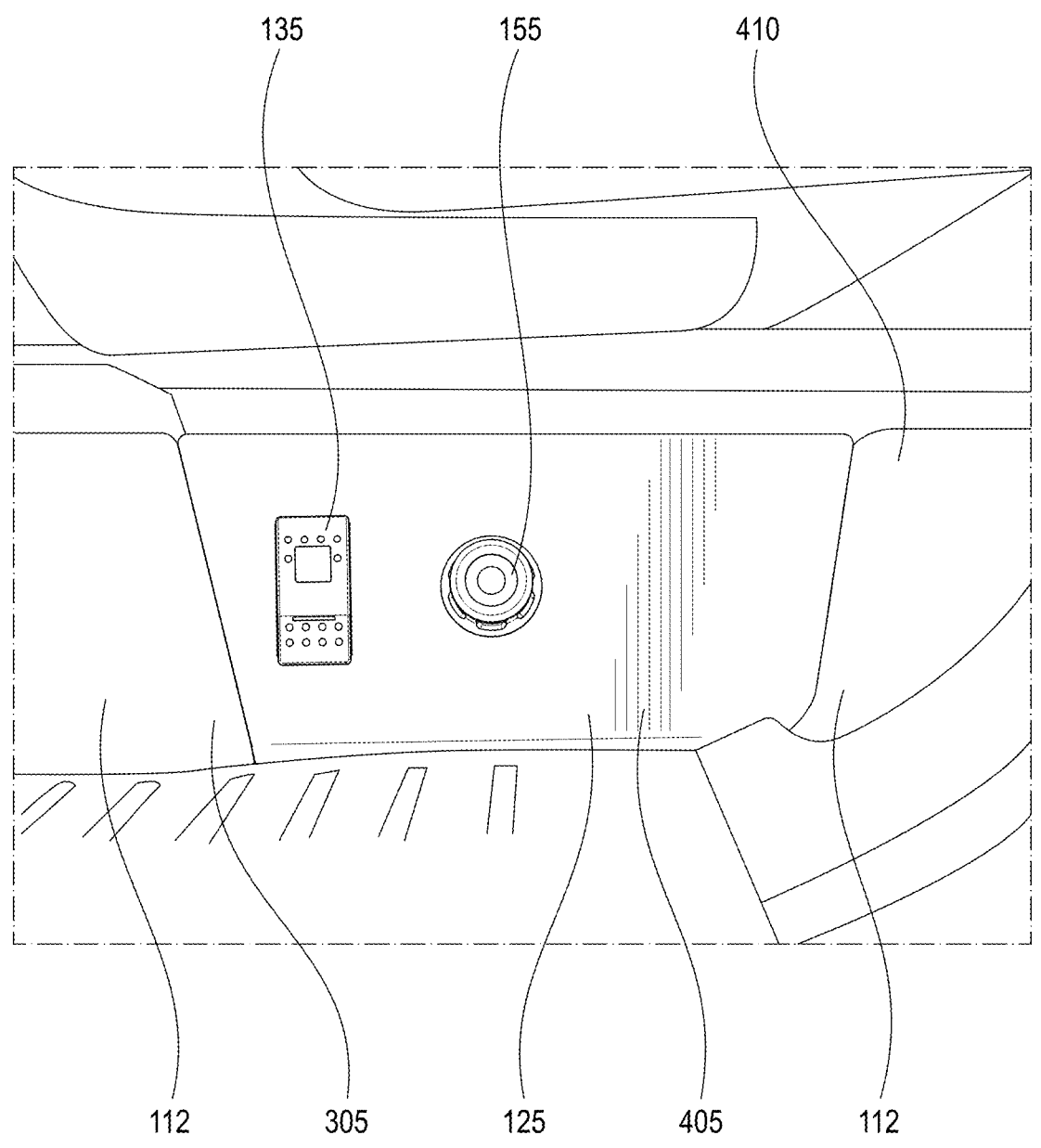
FIG. 4 is a side view of the compressor kit mounted under the seat of the vehicle.

FIG. 4 shows a side view of the compressor kit 105 mounted to the vehicle 120. The mounting bracket 125 has a cover plate 405 that faces the nearest door of the vehicle 120. The relative location of the cover plate 405 on the mounting bracket 125 can vary depending on which side of the vehicle 120 the compressor kit 105 is located. For instance, when the compressor kit 105 is mounted under the seat of the driver, the location of the cover plate 405 can vary depending on whether the vehicle 120 is a lefthand or righthand side driver vehicle. The cover plate 405 sits between the door facing seat tower 305 and a seat base 410. In the illustrated example, the cover plate 405 is shaped as to completely cover the space between the door facing seat tower 305 and the seat base 410. The cover plate 405 prevents the user from inadvertently coming into contact with the air compressor 130. When the air compressor 130 is activated, the air compressor 130 can generate heat that can burn or harm the user if contact is made with the surface of the air compressor 130.

In the depicted example, the switch 135 and the hose coupler 155 are mounted on the cover plate 405 of the mounting bracket 125. The cover plate 405 provides the user with an easily accessible surface for the switch 135 and the hose coupler 155. For example, when the door of the vehicle 120 is open, the cover plate 405 with the switch 135 and the hose coupler 155 are visible and accessible to the user. The user activates and deactivates the air compressor 130 using the switch 135 on the cover plate 405. In one example, the switch 135 is a rocker switch that tilts back and forth to open or close a circuit. In other examples, the switch 135 can be a toggle switch, push button switch, rotary switch, slide switch, touch switch, or any other switch capable of opening and closing a circuit.

The hose coupler 155 provides the user with a connection port for the hose 165 that can be used for the inflation of the tire 170 or other inflatable objects. In one example, the hose coupler 155 is a quick connect coupling such as US Industrial Standard 6150B type coupler. The quick connect coupling facilitates fast and easy attachment and detachment of the hose 165. Other examples of hose couplers 155 can include but are not limited to threaded or push-to-connect couplings. A quick connect system typically includes two main components. A plug found on the hose 165 and a socket found on the hose coupler 155. The socket contains a locking mechanism, often using ball bearings or a collet, that secures the plug into place. To connect the hose 165, the plug is pushed into the socket, compressing a spring inside the socket and allowing the locking mechanism to retract and accommodate the plug. Once fully inserted, the spring releases, and the locking mechanism engages with an audible click, securing the plug. An O-ring or similar sealing element within the socket creates a tight, leak-proof seal, preventing any air from escaping. To disconnect the hose 165, a release collar or lever on the socket is pulled back, compressing the spring again and retracting the locking mechanism, allowing the plug to be removed.

Figure 5:
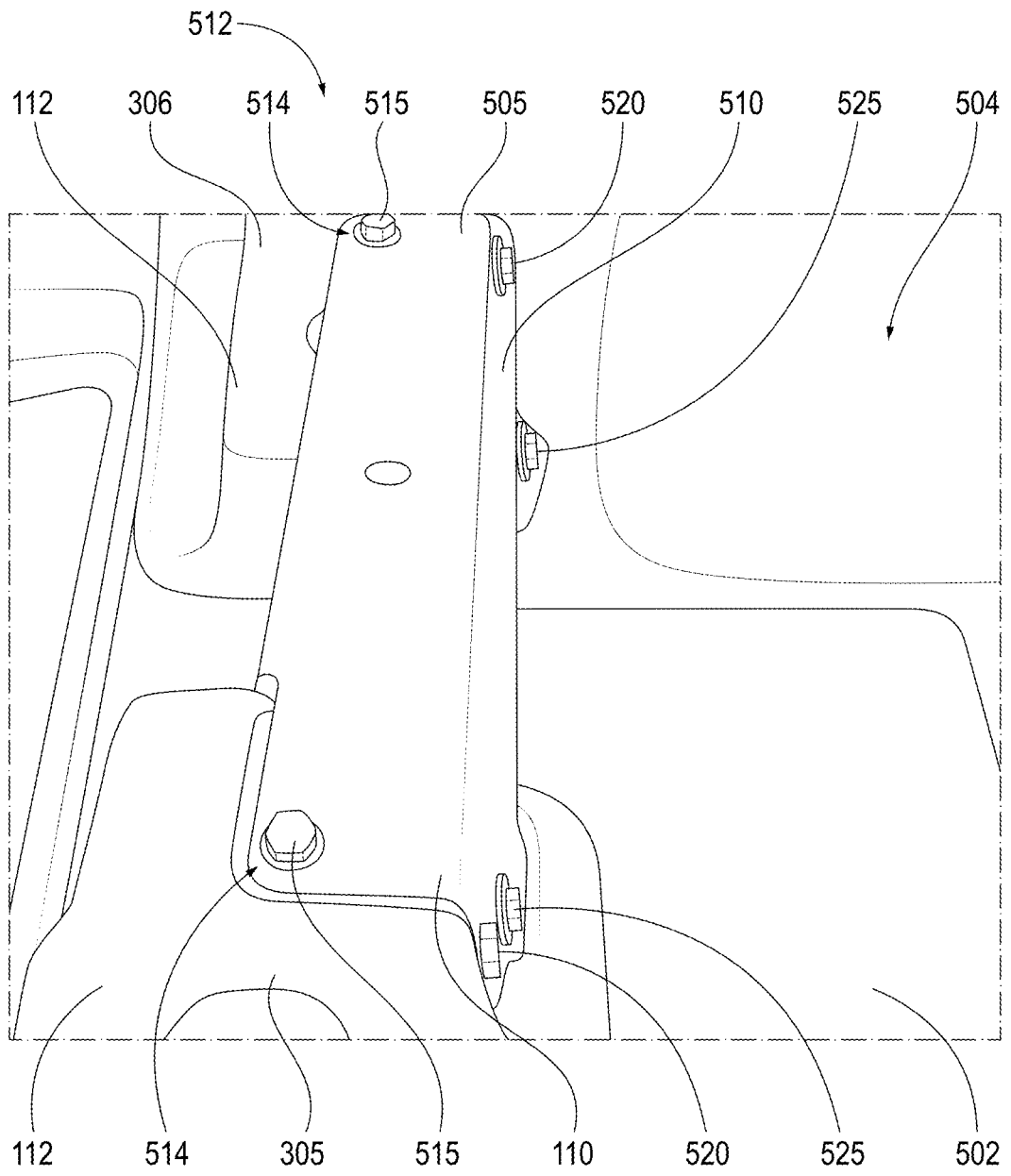
FIG. 5 is a perspective view of a crossmember to which the compressor kit is mounted under the seat of the vehicle.

FIG. 5 shows a perspective view of the crossmember 110 secured to the seat towers 112. As shown, the crossmember 110 extends between the door facing seat tower 305 and the console facing seat tower 306 under the seat 115 of the vehicle 120. The crossmember 110 ties the door facing seat tower 305 and the console facing seat tower 306 together.

The crossmember 110 provides structural support to the door facing seat tower 305 and the console facing seat tower 306. The seat towers 112 extend from a floor 502 of the vehicle 120. Together, the door facing seat tower 305 and the console facing seat tower 306 raise the seat 115 off of the floor 502. With the seat 115 raised, the seat towers 112, the seat 115, and the floor 502 of the vehicle 120 define a seat cavity 504 where the compressor kit 105 is received when mounted to the vehicle 120.

In the illustrated example, the crossmember 110 is in the form of an angle beam. The crossmember 110 generally has an L-shaped cross-sectional shape. The crossmember 110 has a leg 505 and a web 510 that extends transverse (or generally perpendicular) to the leg 505. When the crossmember 110 is mounted to the seat towers 112, the leg 505 faces the bottom of the seat 115, and the web 510 faces the rear of the vehicle 120.

The vehicle 120 has one or more crossmember fasteners 512 that secure the crossmember 110 to the seat towers 112 of the vehicle 120. The vehicle 120 defines one or more corresponding mount openings 514 that receive the crossmember fasteners 512 to secure the crossmember 110 to the seat towers 112. In one version, the mount openings 514 are typically located at the ends of the crossmember 110 proximal to the seat towers 112 so that crossmember fasteners 512 are secured to the seat towers 112. In the illustrated example, the crossmember fasteners 512 include one or more leg fasteners 515, one or more web fasteners 520, and one or more base fasteners 525. The leg 505 is secured to the door facing seat tower 305 and the console facing seat tower 306 with the leg fasteners 515. The web 510 is secured to the door facing seat tower 305 and the console facing seat tower 306 with the web fasteners 520 and the base fastener 525. In one example, the crossmember fasteners 512 are bolts, but other types of fasteners can be used in other examples.

Figure 6:
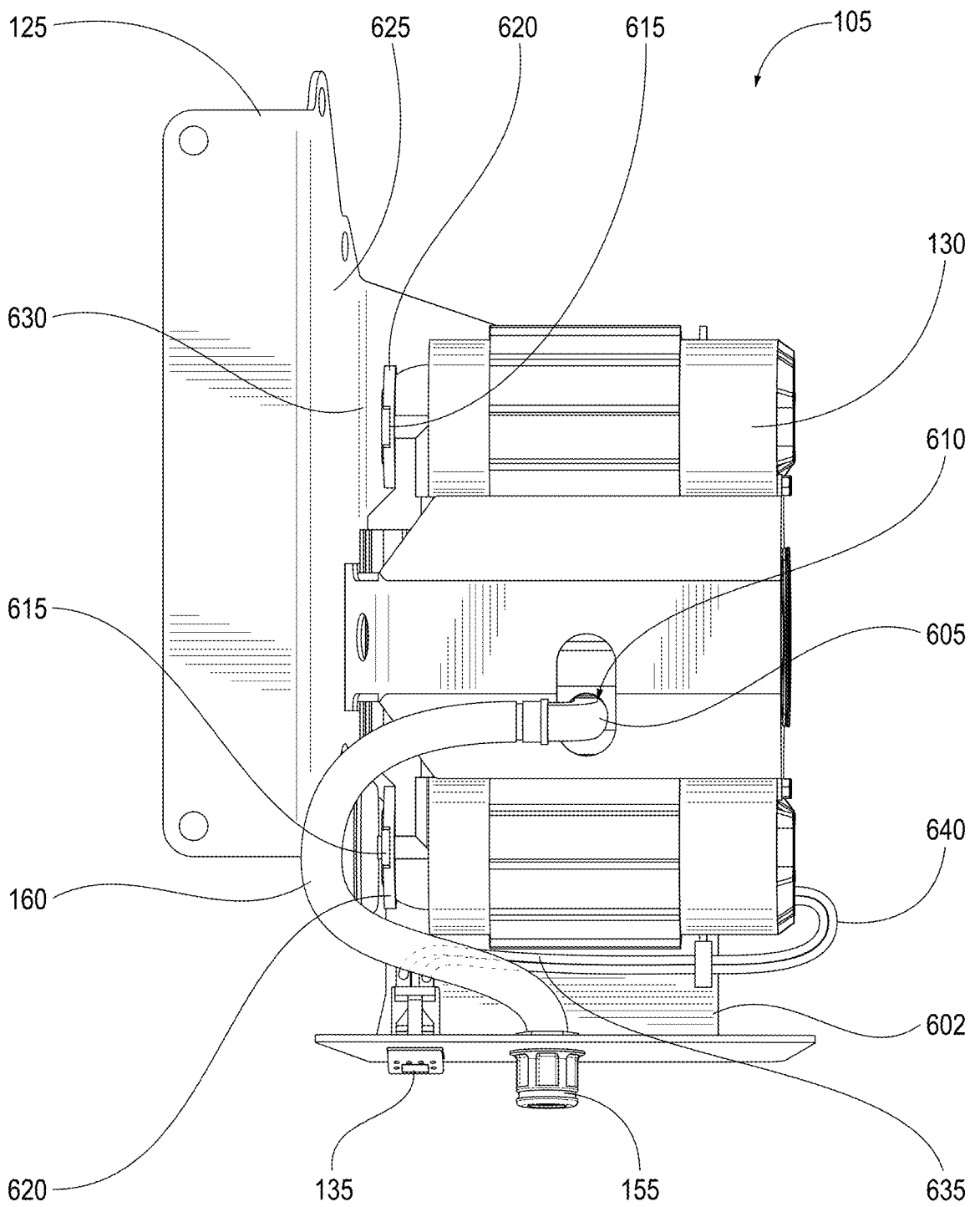
FIG. 6 is a top view of the compressor kit.

FIG. 6 illustrates the top view of the compressor kit 105. As shown, the air compressor 130 is secured to the mounting bracket 125. The mounting bracket 125 has a base plate 602 where the air compressor 130 is secured to the mounting bracket 125. The air compressor 130 is connected to the hose coupler 155 via the air line 160. The line 160 has an outlet 610 that is connected to the air compressor 130. In one example, the elbow 605 is fluidly connected to the outlet 610 of the air compressor 130. The elbow 605 connects the air compressor 130 to the line 160. The bent or L-shape of the elbow 605 helps for fit the compressor kit 105 in the relatively cramp space of the seat cavity 504 underneath the seat 115. The elbow 605 helps to prevent the line 160 from kinking when the line 160 is connected to the air compressor 130. The space between the air compressor 130 and the seat 115 is minimal. The elbow 605 provides a passageway for compressed air to flow from the air compressor 130 to the air line 160.

In one example, the air compressor 130 is a dual air compressor. The dual air compressor has an air intake 615 for each compressor. Each air intake 615 is coupled to a filter 620. The air intake 615 is designed to remove contaminants from the air before it enters the air compressor 130. These contaminants can include dust, dirt, moisture, and other particulates that are present in the ambient air. By filtering out these impurities, the filter helps prevent them from entering the internal components of the air compressor 130, which can reduce wear and tear and prevent potential damage to the air compressor 130 over time. Additionally, clean air promotes more efficient operation of the air compressor 130, leading to consistent air pressure output and ensuring that the tires 170 are inflated to the correct specifications. In addition to the filters 620 coupled to the air compressor 130, the air inside the vehicle 120 is purified by the cabin filter in the vehicle 120. The filters 620 on the air compressor 130 offer an extra layer of protection and can be removed without compromising the operational efficiency of the air compressor 130.

The mounting bracket 125 has a crossmember plate 625 that extends transversely from the base plate 602. The base plate 602 and the crossmember plate 625 are oriented to form an obtuse angle. The crossmember plate 625 is angled for securing the mounting bracket 125 to the crossmember 110. The air compressor 130 is oriented on the mounting bracket 125 such that the air intakes 615 of the air compressor 130 faces the crossmember plate 625 of the mounting bracket 125. A gap 630 between the crossmember plate 625 and the air intakes 615 on the air compressor 130 provide enough space for the air compressor 130 to operate. The crossmember plate 625 is completely solid to prevent the user from coming into contact with the air compressor 130 from the front of the seat. Again, the air compressor 130 can get very hot when in operation and could cause harm to the user if contact is made.

The air compressor 130 is activated and deactivated when the user toggles the switch 135. The switch 135 is secured to the mounting bracket 125. The wire harness 145 includes a switch cable 635, and the switch 135 is connected to the air compressor 130 unit via the switch cable 635. The air compressor 130 includes a switch connector 640 that is coupled to the switch cable 635. The switch 135 controls the operation of the air compressor 130 via the switch cable 635 and the switch connector 640.

Figure 7:
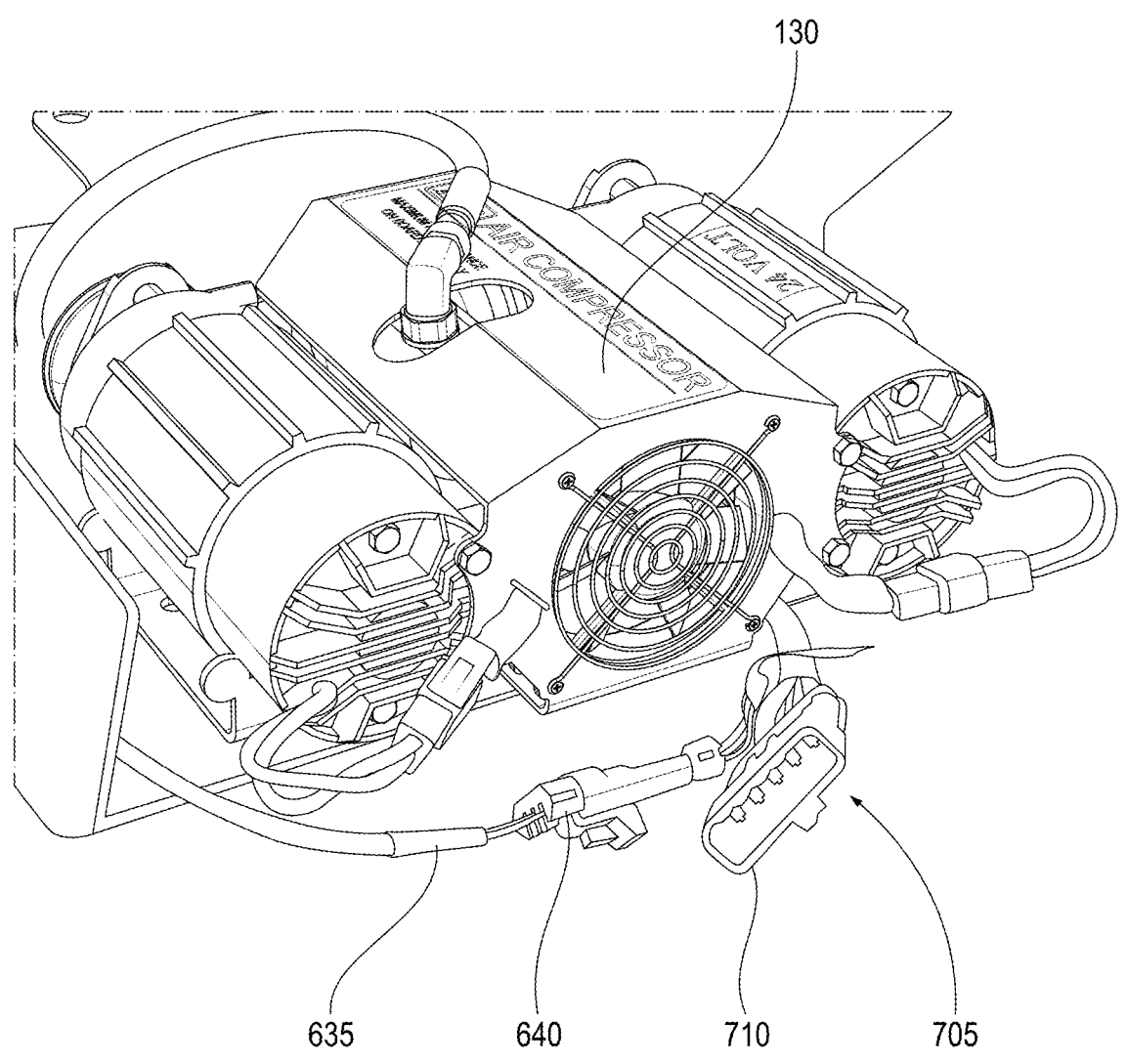
FIG. 7 is a perspective view of an air compressor used in the compressor kit.

FIG. 7 is a rear perspective view of the air compressor 130. In this example, the air compressor 130 is a dual air compressor. A dual air compressor operates by integrating two compressors into a single unit to enhance performance and efficiency. Typically arranged in parallel, the compressors draw in air from a shared source or separate intakes, compressing the air simultaneously to increase the total air output capacity. The compressed air from both units is directed into a common air tank, which accumulates the air for on-demand use in inflation tasks. A control system manages the operation of both compressors, monitoring the air pressure in the tank and dynamically activating or deactivating the compressors to maintain consistent pressure output. The control system, also balances the workload, alternating the operation of the compressors to reduce wear and extend lifespan, or running both simultaneously when maximum output is required. Some dual air compressors incorporate redundancy mechanisms, where one compressor acts as a back up, ensuring continuous operation even if the primary compressor cannot meet demand.

The air compressor receives power from the ESS 150. The air compressor 130 includes one or more electrical connectors 705. One of the electrical connectors 705 include a harness connector 710 that couples to the wire harness 145. The wire harness 145 is connected to the ESS 150 and the vehicle 120. The electrical connectors 705 further includes the switch connector 640 that couples to the switch cable 635. In one example, the switch cable 635 includes flat plug connectors to connect to the switch 135.

Figure 8:
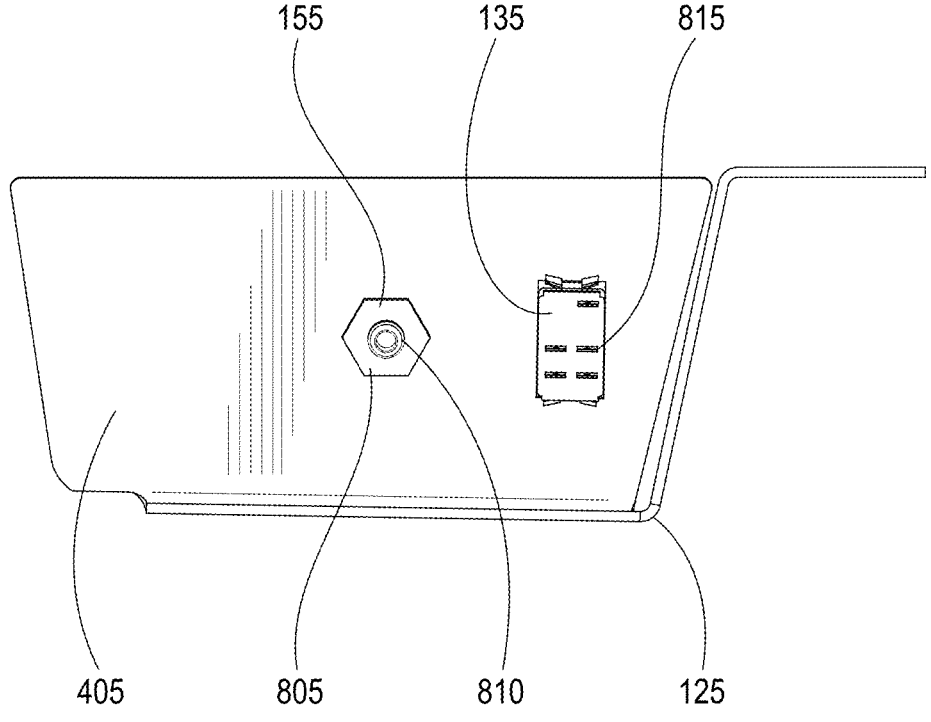
FIG. 8 is a side view of a mounting bracket used in the compressor kit.

FIG. 8 illustrates a side view of the mounting bracket 125. The hose coupler 155 and the switch 135 are secured to the cover plate 405 of the mounting bracket 125. The hose coupler 155 secures to the mounting bracket 125 using a nut 805 that attaches to the hose coupler 155. The hose coupler 155 is inserted into the mounting bracket 125 on the cover plate 405 surface opposite to the air compressor 130. The nut

805 is threaded onto the hose coupler 155 on the cover plate 405 surface facing the air compressor 130. The hose coupler 155 includes a fitting 810 on the side facing the air compressor 130. In this example, the fitting 810 is a threaded fitting. A threaded fitting system involves a male part with external threads on the fitting and a female part with internal threads on the hose 165. To establish a connection, the male part is aligned with the female part and threaded into it, interlocking the threads to draw the two parts tightly together. The threading forms a secure seal to prevent leaks.

The switch 135 is connected to the switch cable 635. In one example, the switch 135 includes blade connectors 815 that connect to the switch cable 635. The switch cable 635 connects to the switch connector 640 on the air compressor 130. The switch 135 is located on an accessible location on the mounting bracket 125. In one example, the switch 135 secures to the mounting bracket 125 with a snap-fit type connector. The switch 135 has flexible tabs that extend outward from the body of the switch 135. The switch 135 is pushed into the mounting bracket 125. As the switch 135 is pushed into the mounting bracket 125, the flexible tabs compress inward. Once the switch 135 is fully inserted into the hole, the tabs spring back to their original position. The expanded tabs hold the switch 135 firmly in place, preventing the switch 135 from being easily removed or dislodged.

Figure 9:
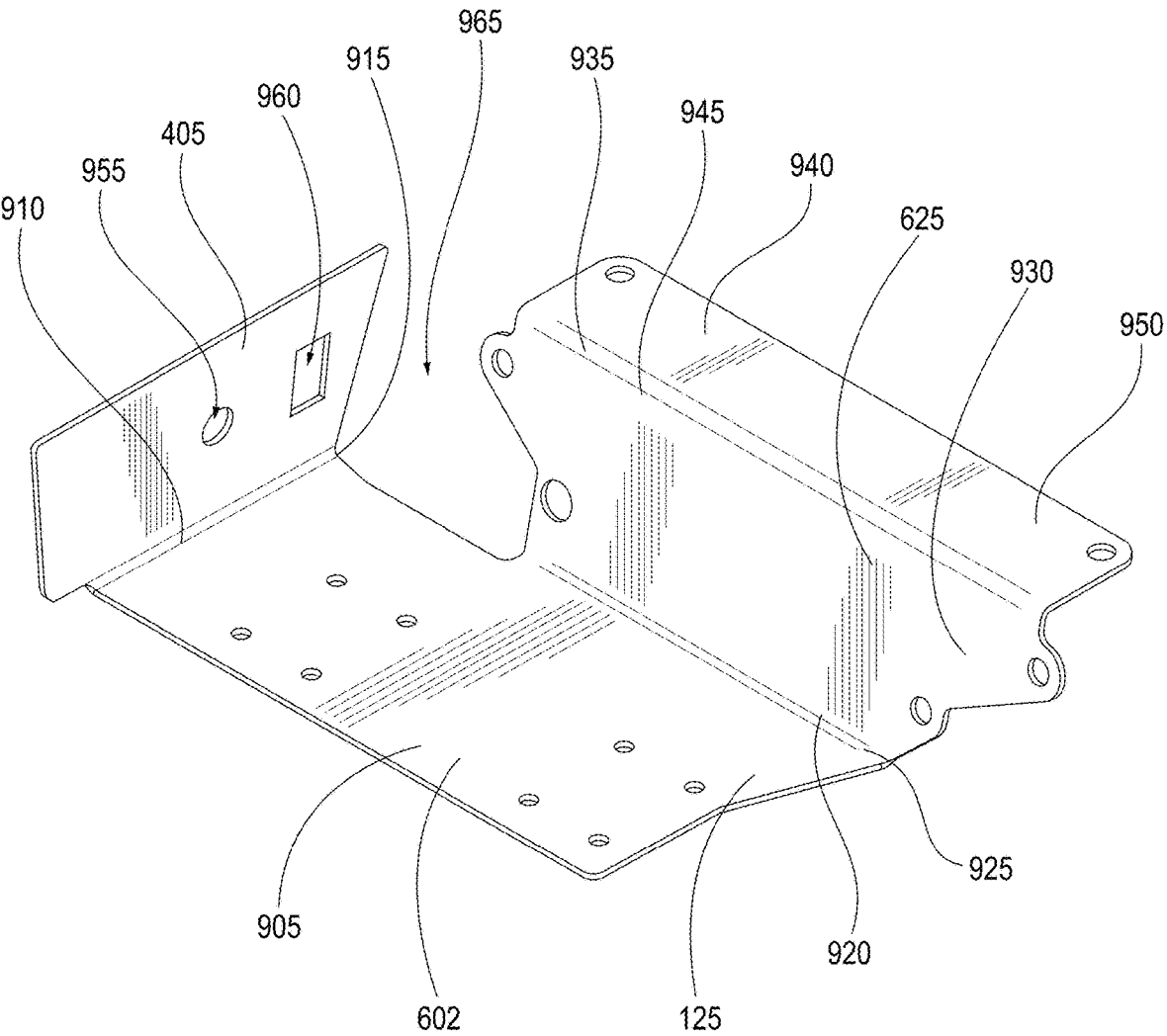
FIG. 9 is a perspective view of the mounting bracket.

FIG. 9 illustrates a top perspective view of the mounting bracket 125. In one example, the mounting bracket 125 is made of aluminum. In other examples, the mounting bracket 125 may be made from other materials. For instance, the mounting bracket 125 in one version is made from metallic materials, like steel and/or titanium, and in other versions, the mounting bracket 125 is made all or in part from non-metallic materials.

In one example, the mounting bracket 125 is shaped to immunize space while accommodating all of the components of the compressor kit 105. The base plate 602 includes a compressor surface 905 where the air compressor 130 is secured to the mounting bracket 125. In one form, the mounting bracket 125 is formed by stamp pressing a plate, but the mounting bracket 125 can be formed in other manners such as via a molding process.

Between the base plate 602 and the cover plate 405, the mounting bracket 125 has a cover plate bend 910 where the cover plate 405 extends transversely from the base plate 602. At the cover plate bend 910, the mounting bracket 125 forms a cover plate edge 915. Between the base plate 602 and the crossmember plate 625, the mounting bracket 125 has a crossmember bend 920 where the crossmember plate 625 extends transversely from the base plate 602. The mounting bracket 125 forms a crossmember edge 925 at the crossmember bend 920. The crossmember plate 625 includes an inner surface 930 that faces the air compressor 130. The mounting bracket 125 is bent at a flange bend 935 to form a flange 940. The transition between the crossmember plate 625 and the flange 940 at the flange bend 935 forms a flange edge 945. The flange 940 generally extends transverse to the crossmember plate 625, and the flange 940 further extends generally parallel to the base plate 602. The crossmember plate 625 and the flange 940 are configured to secure to the crossmember 110. The flange 940 has a flange surface 950 that faces the seat 115 of the vehicle 120 when the compressor kit 105 is mounted.

Each surface of the mounting bracket 125 has holes that accommodate various components. In one example, the holes are laser cut from the mounting bracket 125. The cover plate 405 has a coupling hole 955 and a switch cut-out 960. The coupling hole 955 accommodates the hose coupler 155.

The switch cut-out 960 accommodates the switch 135. In one example, the switch cut-out 960 is rectangular to match the shape of the switch 135. Between the cover plate 405 and the crossmember plate 625, the mounting bracket 125 defines a relief notch 965 that is configured to receive part of the door facing seat tower 305.

Figure 10:
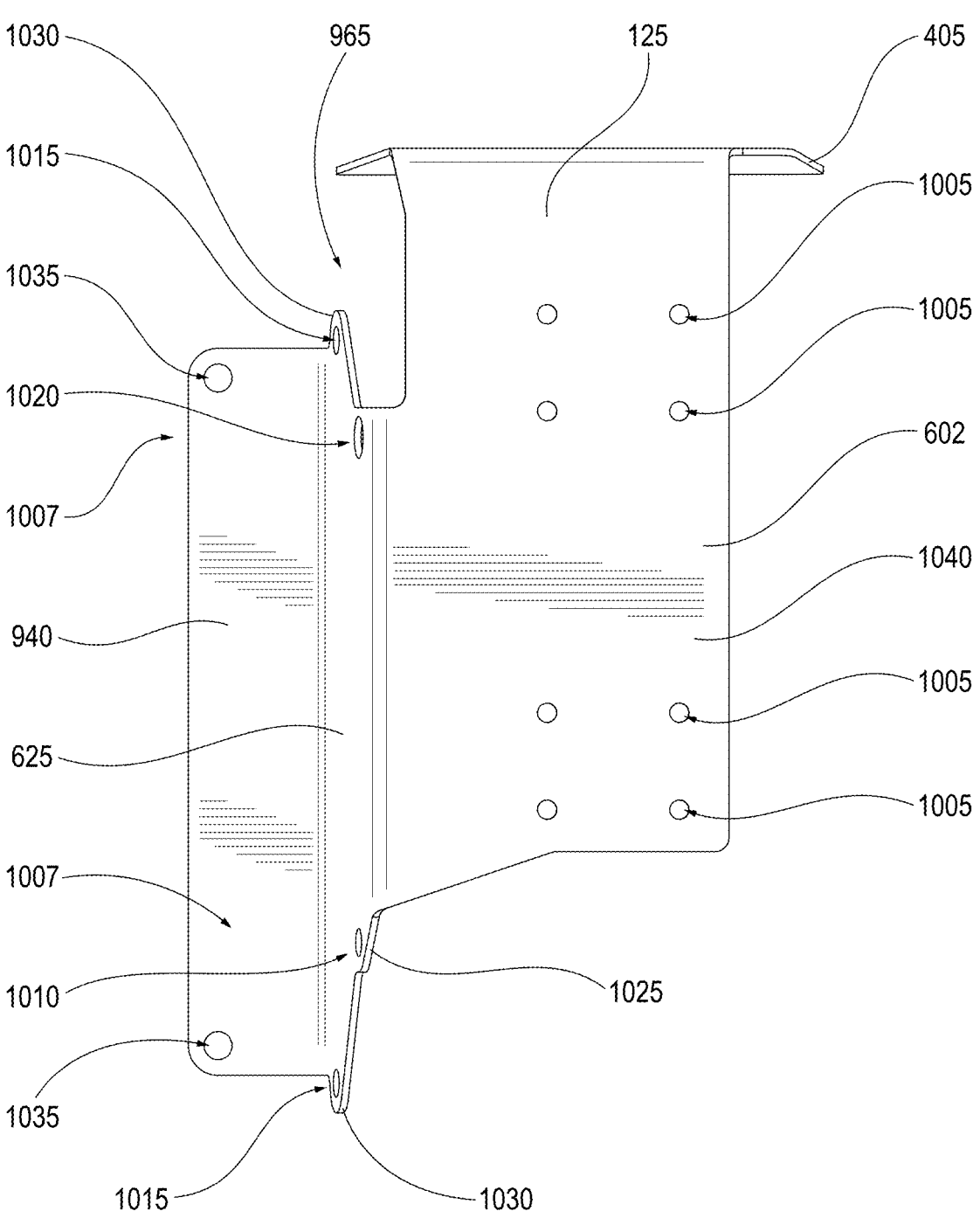
FIG. 10 is a bottom view of the mounting bracket.

Turning to FIG. 10, the base plate 602 includes one or more compressor mounting holes 1005 to accommodate fasteners to secure the air compressor 130 to the base plate 602. In one example, the base plate 602 has eight compressor mounting holes 1005 arranged in two separate square patterns. Each square pattern is spaced apart from the other. The compressor mounting holes 1005 are designed to facilitate the mounting of an air compressor 130 to the mounting bracket 125. Given that different air compressors 130 have varying mounting configurations, the dual square pattern provides flexibility in installation. This arrangement allows users to align the mounting points of the air compressor 130 with the appropriate pattern on the base plate 602. In some cases, not all of the holes need to be used. For example, only those that match the specific mounting arrangement of the air compressor 130 can be used in some cases.

As mentioned before, the mounting bracket 125 has one or more crossmember mounting holes 1007 that match the locations of one or more of the crossmember fasteners 512 that are used to secure the crossmember 110 to the seat towers 112. The same crossmember fasteners 512 that secure the crossmember 110 are used to secure the mounting bracket 125 to the seat towers 112. In some cases, all of the crossmember fasteners 512 are used to mount the mounting bracket 125 to the crossmember 110. In other cases, less than all of the crossmember fasteners 512 are used to mount the mounting bracket 125 to the crossmember 110.

In the illustrated example, the crossmember mounting holes 1007 include one or more base fastener holes 1010 and one or more web fastener holes 1015. The base fastener holes 1010 are defined in the crossmember plate 625 proximal to the base plate 602. One of the existing crossmember fasteners 512 of the crossmember 110 is received in the base fastener holes 1010 to secure the crossmember plate 625 to the web 510 of the crossmember 110. On the side opposite to the relief notch 965, the crossmember plate 625 has a protrusion 1025 that extends away from the crossmember plate 625. The base fastener hole 1010 is defined in the protrusion 1025 of the crossmember plate 625. Opposite to the base fastener hole 1010, the crossmember plate 625 defines a relief hole 1020 that provides relief to receive the head other part of one of the base fastener 525. The relief hole 1020 is defined in the crossmember plate 625 proximal to the relief notch 965. Once the compressor kit 105 is installed, there is sometimes not enough room to remove the existing fastener in the relief hole 1020. The relief hole 1020 creates a cavity for the base fastener 525 on the crossmember 110 to pass through without removal.

From the base plate 602, the crossmember plate 625 widens towards the flange 940 so as to create a pair of wings 1030. The crossmember plate 625 at the wings 1030 define the web fastener holes 1015. The web fastener holes 1015 are configured and positioned to receive the web fasteners 520 in order to further secure the crossmember plate 625 of the mounting bracket 125 to the web 510 of the crossmember 110. The flange 940 further has crossmember mounting holes 1007 that match the location of the leg fasteners 515 when the crossmember 110 is mounted to the seat towers 112. In the depicted example, the crossmember mounting holes 1007 defined in the flange 940 include one or more flange holes 1035. The flange holes 1035 are positioned to coincide with the locations of the leg fasteners 515 of the crossmember 110. When the compressor kit 105 is mounted to the crossmember 110, the leg fasteners 515 are received in the flange holes 1035 to secure the flange 940 of the mounting bracket 125 to the leg 505 of the crossmember 110. With the mounting bracket 125 secured to both the leg 505 and the web 510 of the crossmember 110, the compressor kit 105 is supported along two transverse planes so as to enhanced security for the air compressor 130 when mounted inside the seat cavity 504 of the vehicle 120.

Figure 11:
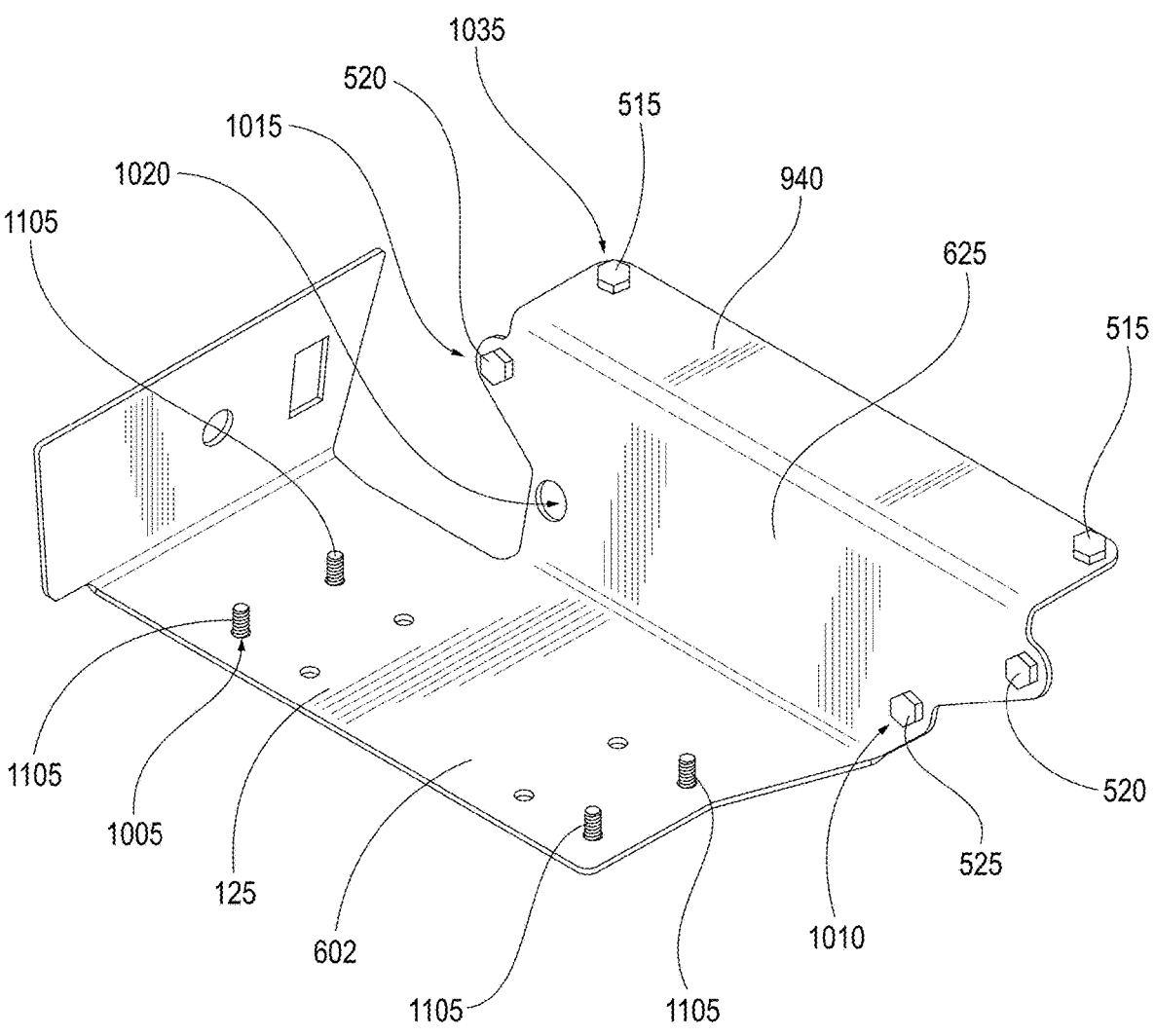
FIG. 11 is a perspective view of the mounting bracket.

FIG. 11 illustrates the mounting bracket 125 with fasteners for securing the air compressor 130 to the mounting bracket 125 and the mounting bracket 125 to the crossmember 110. In one example, the air compressor 130 uses four of the eight compressor mounting holes 1005 for mounting the air compressor 130 onto the base plate 602. Two compressor fasteners 1105 on each of the square patterns are used to secure the air compressor 130 to the base plate 602. The compressor fasteners 1105 are inserted in the compressor mounting holes 1005 in a configuration that creates the greatest distance between the two pairs of compressor fasteners 1105. In one example, the compressor fasteners 1105 are hexagonal bolts.

Once more, at least some of the existing crossmember fasteners 512 on the crossmember 110 of the vehicle 120 are used to secure the mounting bracket 125 to the crossmember 110. In one version, at least one or some of the existing crossmember fasteners 512 on the crossmember 110 are removed prior to installation of the mounting bracket 125, and in another version, all of the crossmember fasteners 512 are removed prior to installation of the mounting bracket 125. As one example, both of the leg fasteners 515 and both of the web fasteners 520 are removed prior to installation along with one of the base fastener 525 that is initially secured to the console facing seat tower 306. In this example, the base fastener 525 on the door facing seat tower 305 remains secured to the door facing seat tower 305 during the installation process. It should be recognized that different numbers of and/or combinations of crossmember fasteners 512 may be removed and reused during the installation process.

Upon removal of the designated crossmember fasteners 512, the mounting bracket 125 is placed against the crossmember 110 with the crossmember plate 625 of the mounting bracket 125 facing the web 510 of the crossmember 110 and the flange 940 resting against the leg 505 of the crossmember 110. In some cases, all or some of the crossmember fasteners 512 are inserted into the crossmember mounting holes 1007 prior to the mounting bracket 125 being positioned against the crossmember 110, and the mount openings 514 in the crossmember 110 and the mounting bracket 125 are aligned. In other cases, the mounting bracket 125 is first placed against the crossmember 110, and the mount openings 514 in the crossmember 110 and the mounting bracket 125 are aligned before the crossmember fasteners 512 are inserted into the crossmember mounting holes 1007. Returning to the previously discussed example, during mounting, the leg fasteners 515, the web fasteners 520, and the base fastener 525 are respectively inserted into and secured at the flange holes 1035, the web fastener holes 1015, and the base fastener holes 1010 of the mounting bracket 125.

Figure 12:
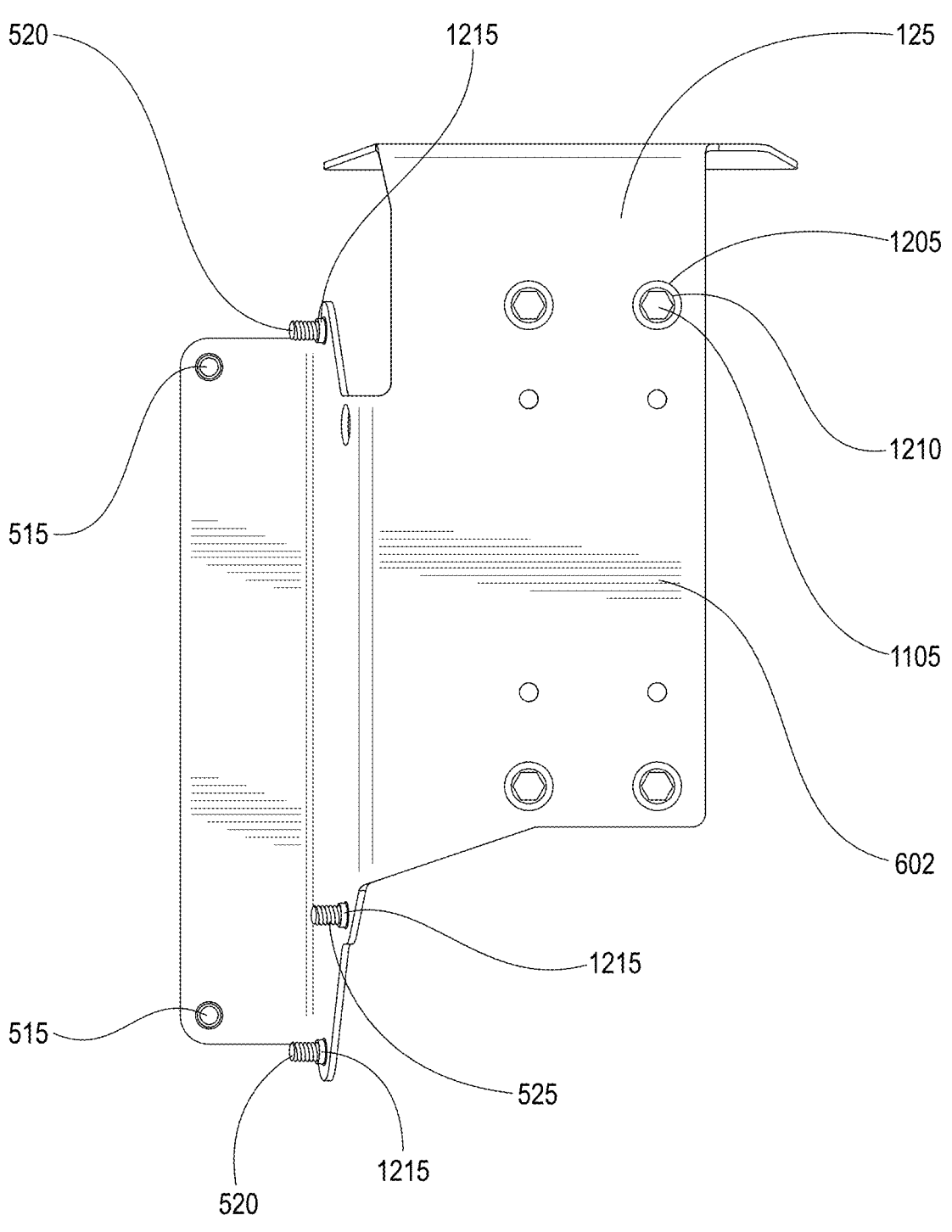
FIG. 12 is a bottom view of the mounting bracket.

Referring to FIG. 12, each compressor fastener 1105, which is in the form of a bolt in this example, is secured to the base plate 602 of the mounting bracket 125 and the air compressor 130 via a washer 1205 and a lock nut 1210. The mounting bracket 125 is placed under the seat 115 of the vehicle 120, which may be subject to vibrations from the movement of the vehicle 120. Additionally, the mounting bracket 125 is subject to any vibrations from the air compressor 130, when the air compressor 130 is activated. The compressor fastener 1105 with a washer 1205 and lock nut 1210 combination provides enhanced security and stability. The compressor fasteners 1105 serve as the primary fasteners, holding the air compressor 130 securely to the mounting bracket 125. The lock nut 1210 prevents loosening due to the vibrations generated by the air compressor 130 or movement of the vehicle 120. The washer 1205, which is placed between the compressor fastener 1105 and the surface of the mounting bracket 125, helps distribute the load evenly, reducing the risk of damage to the mounting surface and enhancing the overall integrity of the connection.

In one example, spacers 1215 are placed between the mounting bracket 125 and crossmember 110 to prevent the crossmember plate 625 of the mounting bracket 125 from being in contact with the crossmember 110. The spacers 1215 are fitted around the web fasteners 520 and secured in place when the web fasteners 520 are secured to the mounting bracket 125 and the crossmember 110.

Figure 13:
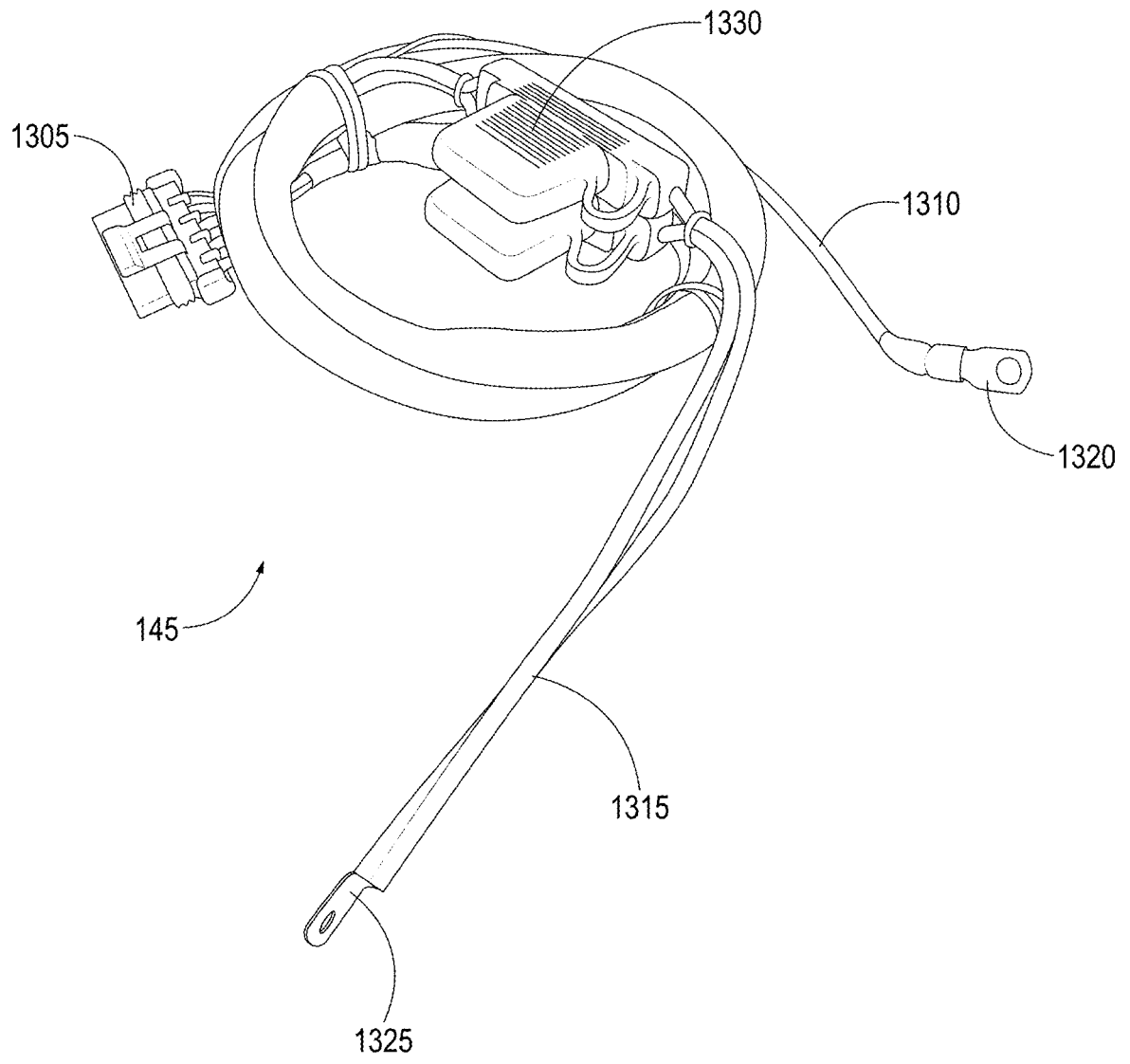
FIG. 13 is a perspective view of a wire harness used in the compressor kit.

FIG. 13 shows a perspective view of the wire harness 145 according to one example. The wire harness 145 includes a plug 1305 that connects to the harness connector 710 on the air compressor 130. The wire harness 145 further includes a ground wire 1310 and a positive wire 1315. The ground wire 1310 has a ground lug 1320 that connects to a ground terminal on the vehicle 120. The positive wire 1315 has a positive lug 1325 that connects to a terminal on the ESS 150. The wire harness 145 further includes a fuse 1330. The fuse 1330 is located on the positive wire 1315 between the positive lug 1325 and the plug 1305. The fuse 1330 on the wiring harness protects the air compressor 130 from potential short circuits or overloads. The positive wire 1315 on the wire harness 145 provides the air compressor 130 with access to the 12 or 24 volt (V) electrical supply from the ESS 150 of the vehicle 120.

In some vehicle designs, such as in the Grenadier® 4×4 vehicle, the battery is mounted below the floor in the cabin of the vehicle 120, rather that in the engine compartment. For the Grenadier® 4×4 vehicle, the battery is mounted in the floor of the vehicle 120 that is underneath the rear passenger seat located on the driver side of the vehicle 120. When the ESS 150 is positioned in this or a similar manner, the wire harness 145 is routed beneath the floor lining of the vehicle 120, extending toward the rear of the vehicle 120, where the ESS 150 is located. In other vehicle designs, connecting the air compressor 130 to the ESS 150 typically involves routing wires through the firewall of the vehicle 120 to reach the engine bay or compartment. This process often demands significant effort, including the potential removal of various vehicle components to create a viable path for the wiring. By contrast, connecting the air compressor 130 to the ESS 150 positioned in the rear of the vehicle reduces installation complexity. This method requires fewer tools and less labor. Additionally, routing the wire harness 145 under the floor lining keeps the wire harness 145 hidden from view, maintaining the aesthetic of the vehicle and ensuring the interior remains uncluttered.

Figure 14:
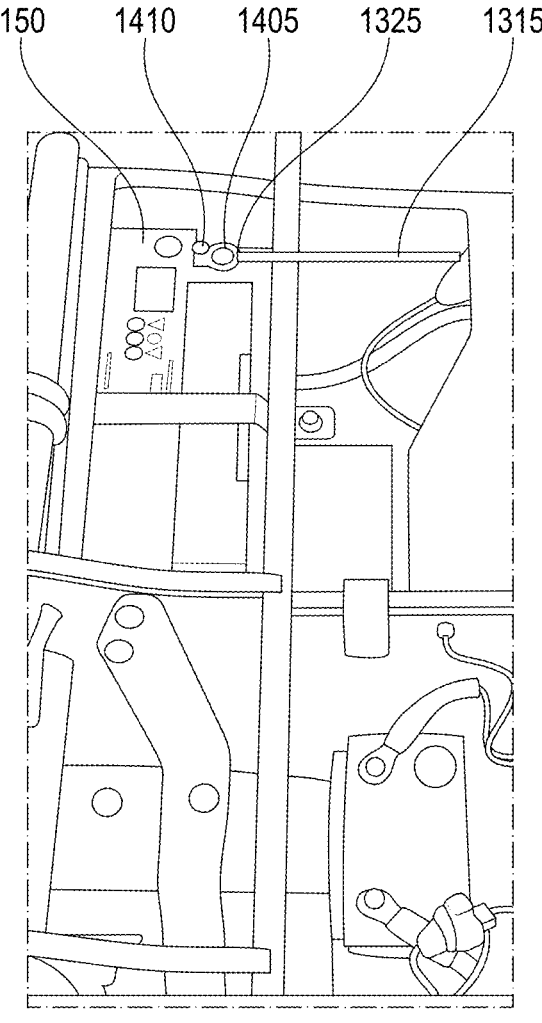
FIG. 14 is a top view of an Energy Storage System ("ESS") that supplies electrical power to the compressor kit.

FIG. 14 shows a top perspective view of an example of the wire harness 145 connected to the ESS 150, which is a vehicle battery, such as those commonly found in the Grenadier® 4×4 vehicle. Typically, the vehicle 120 includes a positive cable that connects to the positive terminal 1405 on the car battery. The positive cable is secured to a positive terminal 1405 using a positive nut 1410, ensuring a stable electrical connection. In one example, the positive lug 1325 on the wire harness 145 has a hole that is compatible with the positive nut 1410 size used for the positive cable. The positive wire 1315 of the wire harness 145 can be secured to the same positive nut 1410 location on the car battery, ensuring efficient power transfer. Using the positive nut 1410 that secures the positive cable to the positive terminal 1405, eliminates the need for additional hardware.

Figure 15:
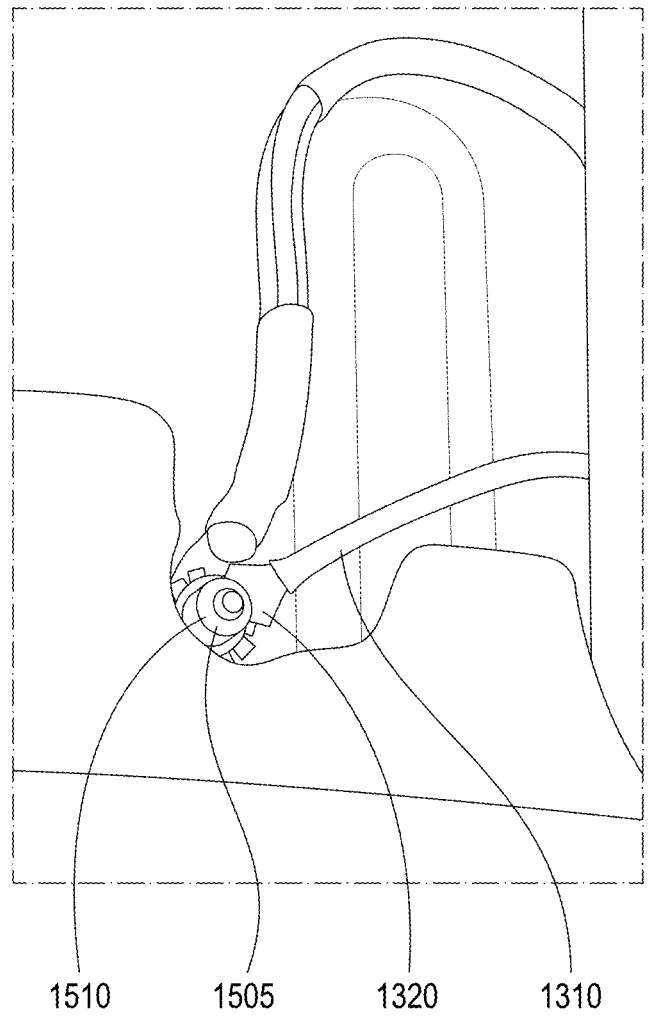
FIG. 15 is a top view of a ground wire for the FIG. 13 wire harness.

FIG. 15 shows an example of the ground wire 1310 connected to the vehicle 120. Typically, but not always, the vehicle 120 includes a ground cable connected to the chassis of the vehicle 120. The connection of the ground cable to the chassis of the vehicle establishes a common grounding pathway for the electrical system of the vehicle. To complete the electrical circuit, the air compressor 130 is connected to a ground point 1505 on the vehicle 120 via the ground wire 1310. Typically, but not always, the chassis of the vehicle 120 serves as a common ground for the electrical system of the vehicle 120, allowing current to return to the ESS 150 and complete the circuit. The ground cable is connected to the chassis at the ground point 1505 using a ground nut 1510. The same ground nut 1510 can be utilized to secure the ground wire 1310 from the wire harness 145 to the chassis of the vehicle 120. The ground lug 1320 on the ground wire 1310 features a hole that can accommodate the existing ground point 1505. Connecting the ground wire 1310 to the ground point 1505 ensures a secure and reliable connection. Additionally, using the ground nut 1510 to attach the ground wire 1310 to the chassis eliminates the need for additionally components or unnecessary drilling.

Figure 16:
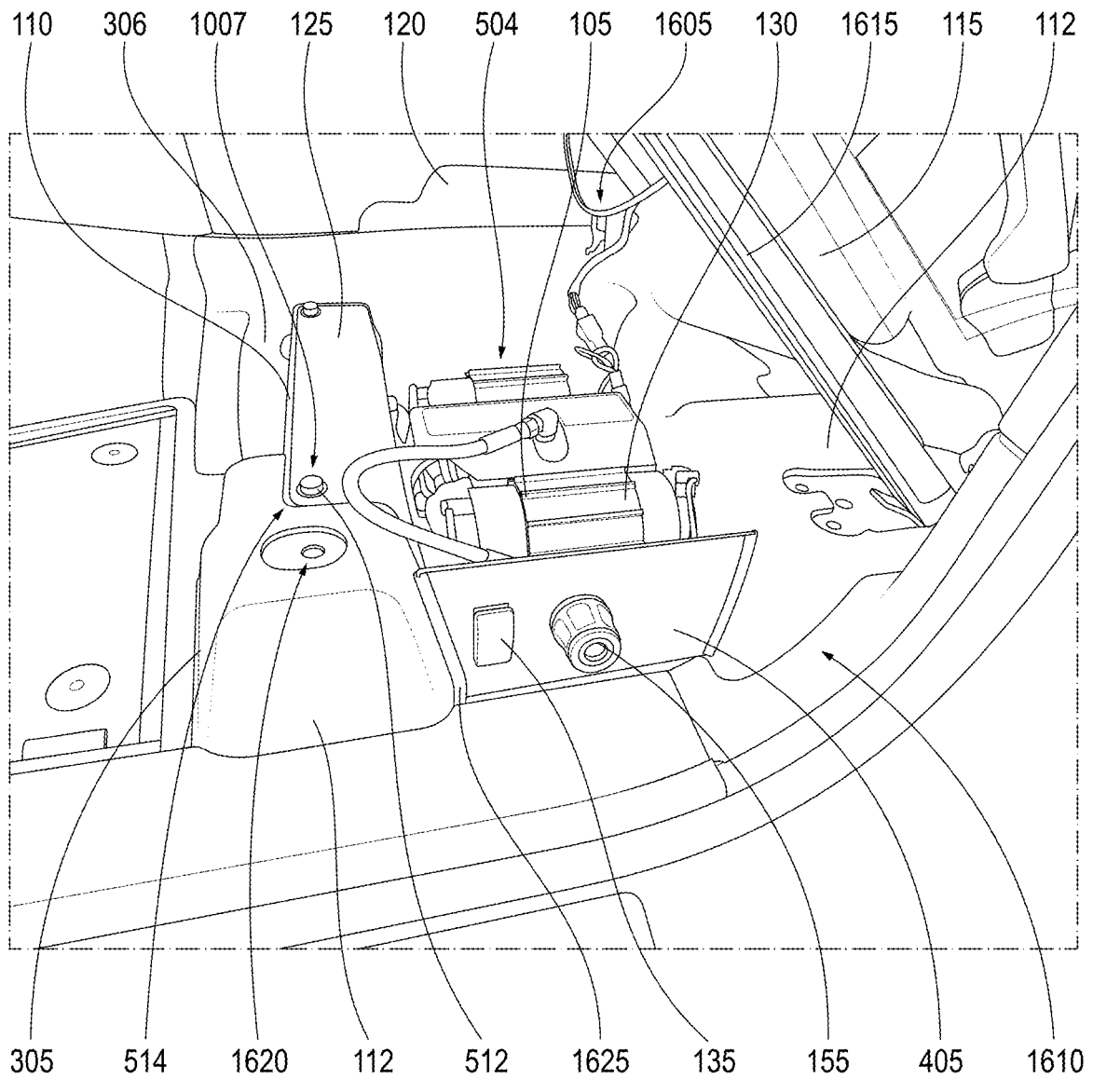
FIG. 16 is a top perspective view of the compressor kit mounted in the seat cavity inside a vehicle cabin of the vehicle during installation.

A technique for installing the compressor kit 105 in the vehicle 120 will be initially described with reference to FIG. 16. FIG. 16 shows a top perspective view of a vehicle cabin 1605 inside the vehicle 120 during installation of the compressor kit 105 in the seat cavity 504. FIG. 16 is viewed from a door opening 1610 of the vehicle 120. In the illustrated example, the seat 115 has one or more seat rail 1615 that facilitate seat position adjustments. Before installation, the seat fasteners, such as bolts, that secure the 1615 of the seat 115 to the seat towers 112 are removed. In the illustrated example, the seat bolts for securing the seat rail 1615 are unthreaded from seat mount openings 1620 in the seat towers 112. Once the seat fasteners are removed, or in some cases just loosened, the seat 115 is flipped back in the manner as depicted in FIG. 16 so as to expose the crossmember 110.

Once the crossmember 110 is accessible, the crossmember fasteners 512 are removed from the mount openings 514 in the crossmember 110. In some cases, one or more of the crossmember fasteners 512 remain attached to the crossmember 110 and/or the seat towers 112. In one version, the air compressor 130 is secured to the mounting bracket 125 via the compressor fasteners 1105 before being installed in the seat cavity 504, and in another version, the mounting bracket 125 is installed in the seat cavity 504 before the air compressor 130 is mounted to the mounting bracket 125. In the illustrated example, the cover plate 405 of the mounting bracket 125 has a gasket 1625 that seals between the seat towers 112 and the cover plate 405 to prevent water and/or debris infiltration into the seat cavity 504 where the air compressor 130 is housed. When mounting the mounting bracket 125 to the crossmember 110, the appropriate crossmember mounting holes 1007 are aligned with the mount openings 514 in the crossmember 110. In one variation, the crossmember fasteners 512 are inserted into the crossmember mounting holes 1007 before the mounting bracket 125 is aligned with the crossmember 110. In another variation, the crossmember fasteners 512 are inserted into the crossmember mounting holes 1007 and the mount openings 514 after alignment of the mounting bracket 125 on the crossmember 110. In situations where one (or more) of the crossmember fasteners 512 remains secured to the crossmember 110, the corresponding relief hole 1020 is aligned with still fastened crossmember fastener 512 so that the part of the crossmember fastener 512, such as a bolt head, is received inside the relief hole 1020 when the mounting bracket 125 is mounted. Once the crossmember fasteners 512 are in the mount openings 514, the crossmember fasteners 512 are tightened to secure the mounting bracket 125 to the crossmember 110. Before, during, or even after the mounting bracket 125 is mounted to the crossmember 110, the wire harness 145 is routed inside the vehicle cabin 1605 of the vehicle 120, and the wire harness 145 connected between the air compressor 130 and the ESS 150 to form an electrical connection.

Figure 17:
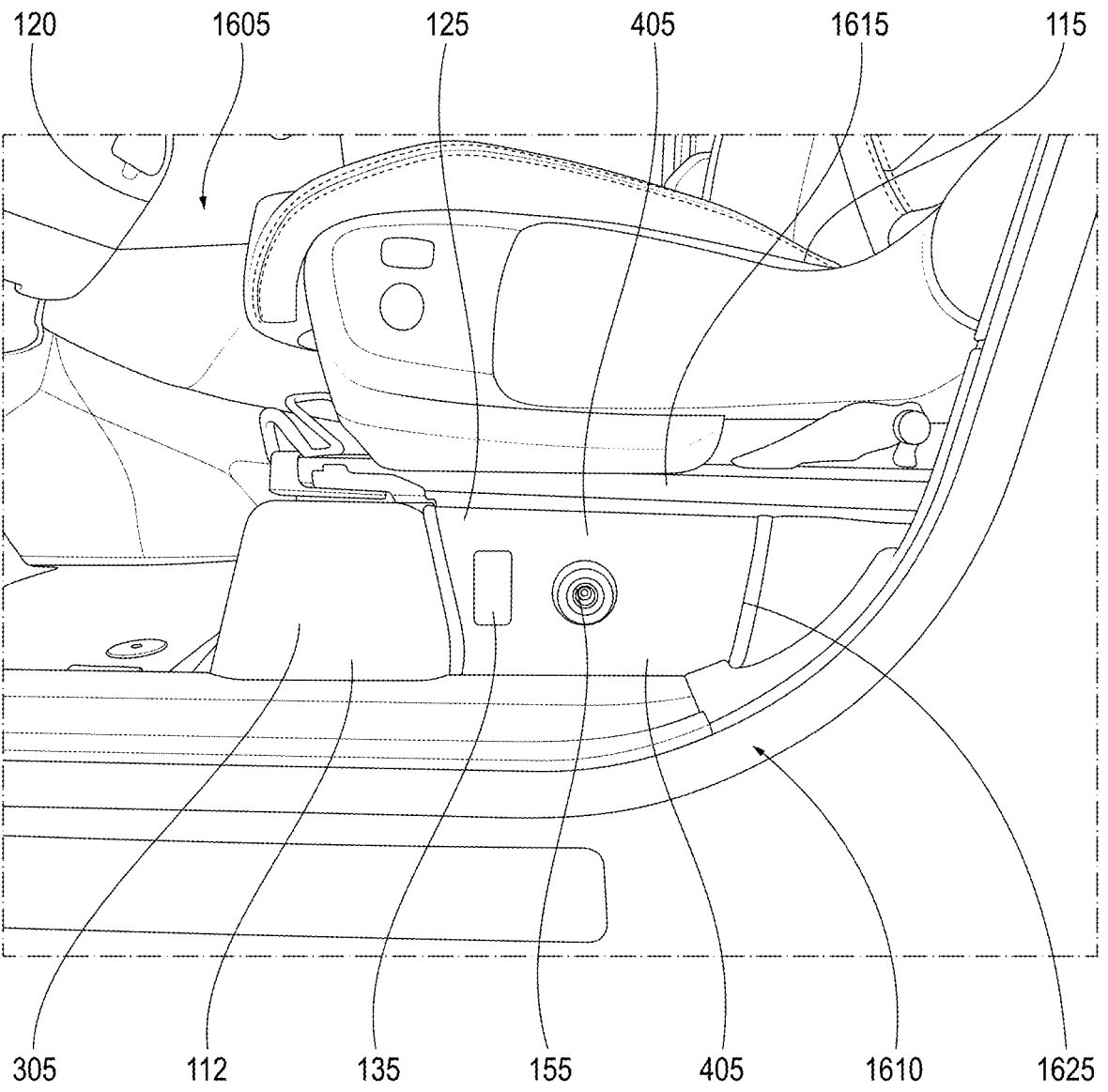
FIG. 17 is a side view of the compressor kit when mounted under the seat of the vehicle.

Once the mounting bracket 125 is secured to the crossmember 110 and the wire harness 145 is in place, the seat 115 can be flipped back down in the manner as depicted in FIG. 17. In the illustrated example, the seat rail 1615 of the seat 115 rest on the seat towers 112. The previously removed seat fasteners are then threaded back into the seat mount openings 1620 so as to secure the seat rail 1615 of the seat 115 to the seat towers 112. Once the wire harness 145 is connected to the ESS 150, the air compressor 130 is able to be used.

As can be seen in the FIG. 17 example, the switch 135 and the hose coupler 155 on the cover plate 405 of the mounting bracket 125 are readily accessible through the door opening 1610 when the door of the vehicle 120 is opened. With the air compressor 130 mounted inside the vehicle cabin 1605 under the seat 115, the air compressor 130 is protected from the elements. The cover plate 405 of the mounting bracket 125 along with the gasket 1625 between the cover plate 405 and the seat towers 112 further helps to protect the air compressor 130, such as when the door is opened, as well as the operator for the air compressor 130. It should be recognized with the switch 135 and the hose coupler 155 facing the door opening 1610 makes operation of the air compressor 130 convenient for the user.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"Ancillary Device" generally refers to any equipment within a system that performs a function outside a primary function of the system. The ancillary device may include a machine, actuator, sensor, instrument, computational device, controller, tool, imaging device, entertainment device, and/or monitoring device, to name just a few examples. The operation of the system is generally unaffected by the removal of one or more of the ancillary devices. For a vehicle, the primary function is to propel and direct (e.g., steer) the vehicle, so any activity outside of these primary functions would be considered ancillary. Some common non-limiting examples of ancillary devices for vehicles include radios, entertainment systems, lighting systems, and HVAC (heating, ventilation, and air conditioning) systems.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Cable" generally refers to one or more elongated strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongated strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used. A cable may include a sheath or layer surrounding the cable with electrically non-conductive material to electrically insulate the cable from inadvertently electrically connecting with other conductive material adjacent the cable. A cable may include multiple individual component cables, wires, or strands, each with, or without, a non-conductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Cavity" generally refers to an empty space in a solid object. The cavity can be completely or partially surrounded by the solid object. For example, the cavity can be opened to the surrounding environment.

"Conductor" or "Conductive Material" generally refers to a material and/or object that allows the free flow of an electrical charge in one or more directions such that relatively significant electric currents will flow through the material under the influence of an electric field under normal operating conditions. By way of non-limiting examples, conductors include materials having low resistivity, such as most metals (e.g., copper, gold, aluminum, etc.), graphite, and conductive polymers.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Fastener" generally refers to a hardware device that mechanically joins or otherwise affixes two or more objects together. By way of non-limiting examples, the fasteners can include bolts, dowels, nails, nuts, pegs, pins, rivets, and screws, to just name a few.

"Floor" generally refers to the flat base panel of a vehicle where the support structures are mounted. The floor can be made of many different materials such as wood, plastics, metals, rubbers, or a combination of materials. The floor may have tracks or mounting brackets for mounting support structures that are flush with the rest of the floor and/or protrude above the standard floor height. The floor of a vehicle is also the primary area for storage as that is where the items are set. For example, when loading the back of a van, the groceries are typically set on the floor. Additionally, the floor may be covered in a material to make it more comfortable. Some materials used may be carpet, rubber, metals, or leathers.

"Fuse" generally refers to an electrical safety device that protects an electric circuit from excessive electric current. The fuse is designed to be a sacrificial device. Once the fuse has operated to create an open circuit, the fuse must be replaced and/or rewired. For example, the fuse may include a material that melts and breaks an electric circuit if the current through the material exceeds a specified safe level.

"Gap" generally refers to a space between objects, surfaces, or points.

"Hole" generally refers to a hollow portion through a solid body, wall, or a surface. A hole may be any shape. For example, a hole may be, but is not limited to, circular, triangular, or rectangular. A hole may also have varying depths and may extend entirely through the solid body or surface or may extend through only one side of the solid body.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"Lateral" generally refers to being situated on, directed toward, or coming from the side.

"Longitudinal" generally refers to the length or lengthwise dimension of an object, rather than across.

"Metallic" generally refers to a material that includes a metal or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other nonconductive material.

"Notch" generally refers to an indentation, cut, groove, channel, and/or incision on an edge or surface. In some non-limiting examples, the notch includes a V-shaped or U-shaped indentation carved, scratched, etched, stamped, and/or otherwise formed in the edge or surface. The notch can have a uniform shape or a non-uniform shape.

"Opening" generally refers to a space or hole that something can pass through.

"Original Equipment Manufacturer" or "OEM" generally refers to an organization that makes finished devices from component parts bought from other organizations that are usually sold under their own brand in a consumer or commercial market.

"Plug" generally refers to device that electrically connects a wire, cord, and/or cable to and inserts into a socket and/or jack. In other words, a plug is typically a male connector that interfaces with a female connector to make an electrical connection. Plugs generally include one or more electrical contacts, such as electrically conductive pads, pins, leaves, and/or plates as examples. In some cases, the contacts in a plug are recessed within the plug, and contacts from a socket insert into the plug when plugging into the socket. Plugs often, but not always, come in a standardized shape, such as USB-A, USB-B, USB-C, HDMI, VGA, 3.5 mm audio, Ethernet, landline telephone, and/or various standardized power plugs to name a few. Similarly, the contacts in a plug are generally arranged according to a standardized pinout. For example, Ethernet cables typically include a Registered Jack (RJ) 45 plug to support network connections between computers, modems, routers, network switches, and/or other network devices. As another example, telephone cables generally include an RJ11, RJ14, and/or RJ25 plug to connect telephones and/or telephone network devices. Standardized plug shapes and pinouts generally match those of the standard sockets to ensure proper connection between the contacts in the plug and the socket. Further, the plug typically mechanically connects to the socket when the plug is inserted, such as through a clip, tab, and/or another mechanism. In some cases, the plug includes a latch tab and/or a keying mechanism to ensure a plug can only be inserted in one orientation.

"Pneumatic Tire" generally refers to a type of tire that uses pressurized air or other gas contained within an airtight inner chamber or casing to support a load and provide cushioning for a wheel. The pneumatic tire contains the pressurized air or gas. In some pneumatic tires, the pressurized gas is contained in a separate inner tube. Other types of tires, such as tubeless tires, do not have an inner tube. In tubeless type pneumatic tires, the tire itself forms the airtight seal with the rim of the wheel so as to contain the pressurized gas. The pressurized gas inside the tire acts as a spring so as to absorb mechanical shocks and provide a comfortable ride for a vehicle.

"Pump" generally refers to a machine that moves fluids, such as gases, liquids, and/or slurries, by mechanical action. Typically, but not always, the pump is manually powered by a human or automatically powered through energy sources like electrical energy. Commonly, pumps are used to move fluids to different places and/or to increase pressure of the fluid. Some common pump types include centrifugal pumps, positive displacement pumps, axial flow pumps, peristaltic pumps, and gravity pumps.

"Seat" generally refers to a type of support structure or a place constructed for the purpose of allowing a human and/or other animal to sit. Some examples of seats include chairs, stools, benches, saddles, and sofas to name just a few. Typically, but not always, the seat can further include a backrest, armrest, and a headrest as well as other features.

"Snap-Fit Connector" or "Snap-Fit Connection" generally refers to a type of attachment device including at least two parts, with at least one of which being flexible, that are interlocked with one another by pushing the parts together. The term "Snap-Fit Connector" may refer to just one of the parts, such as either the protruding or mating part, or both of the parts when joined together. Typically, but not always, the snap-fit connector includes a protrusion of one part, such as a hook, stud, and/or bead, that is deflected briefly during the joining operation and catches in a depression and/or undercut in the mating part. After the parts are joined, the flexible snap-fit parts return to a stress-free condition. The resulting joint may be separable or inseparable depending on the shape of the undercut. The force required to separate the components can vary depending on the design. By way of non-limiting examples, the flexible parts are made of a flexible material such as plastic, metal, and/or carbon fiber composite materials. The snap-fit connectors can include cantilever, torsional, and/or annular type snap-fit connectors. In the annular snap-fit type connector, the connector utilizes a hoop-strain type part to hold the other part in place. In one form, the hoop-strain part is made of an elastic material and has an expandable circumference. In one example, the elastic hoop-strain part is pushed onto a more rigid part so as to secure the two together. Cantilever snap-fit type connectors can form permanent type connections or can be temporary such that the parts can be connected and disconnected multiple times. A multiple use type snap-fit connector typically, but not always, has a lever or pin that is pushed in order to release the snap-fit connection. For a torsional snap-fit connector, protruding edges of one part are pushed away from the target insertion area, and the other part then slides in between the protruding edges until a desired distance is reached. Once the desired distance is reached, the edges are then released such that the part is held in place.

"Terminal" generally refers to a plug, socket, and/or other connection (e.g., male, female, mixed, hermaphroditic, or otherwise) for mechanically and electrically connecting two or more wires or other conductors.

"Tire" generally refers to a toroidal or doughnut-shaped component of a wheel that encircles a rim of the wheel. The tire is configured to transfer the load of a vehicle to the ground or other driving surface and provide traction between the vehicle and the driving surface. Tires can be complex structures made from a variety of materials such as rubber, steel, and/or fabric. Some common types of tires include pneumatic, solid, semi-pneumatic, and foam-filled tires, to name just a few examples.

"Tire Pressure" generally refers to the force exerted by a compressed air or other gas within a pneumatic tire, measured as a function of force per unit area. Tire pressure is typically expressed in units of pounds per square inch (psi) in the United States, or kilopascals (kPa) using the metric system. Tire pressure is usually measured as gauge pressure, which is the pressure relative to atmospheric pressure. In contrast, absolute pressure is the total pressure, including atmospheric pressure. Pneumatic tires typically rely on pressurized air or other gas to maintain the shape of the tire and support load. The tire pressure can be increased by adding air or other gas to increases the number of air or gas molecules inside the tire, and conversely, tire pressure can be reduced by removing the air or other gas from the tires so as to reduce the number of air or gas molecules in the tire. Tire pressure may be for example impacted by temperature, load, and altitude. Tire pressure directly affects the ability of the tire to support weight. Underinflation reduces load capacity, and overinflation increases load capacity but can lead to other issues. The tire pressure also influences the stiffness of the tire, which affects handling, ride comfort, and rolling resistance. Proper tire pressure can be used to adjust the contact patch between the tire and the driving surface so as to enhance tire grip and stability.

"Tire Pressure Monitoring System" or "TPMS" generally refers to an electronic system designed to monitor air pressure inside pneumatic tires on vehicles. The TPMS can be configured to report real-time tire pressure information of the vehicle, such as via a gauge, a pictogram display, a low-pressure warning light, audible sound, and/or other output device. TPMS can be generally categorized into two different types, direct TPMS (dTPMS) and indirect TPMS (iTPMS). The dTPMS types include pressure sensors mounted on each wheel, either internally or externally to the wheel. The dTPMS sensors physically measure the tire pressure in each tire and for example report the pressure readings to an instrument cluster in the vehicle. The iTPMS types do not use physical pressure sensors but indirectly measure air pressures by monitoring individual wheel rotational speeds and other signals available outside of the tire. For example, iTPMS types can for example indirectly measure pressure through wheel speed sensors of Antilock Braking Systems (ABS).

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Unitary" generally refers to a single, continuous entity formed without multiple pieces.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, vans, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 system
105 compressor kit
110 crossmember
112 seat towers
115 seat
120 vehicle
125 mounting bracket
130 air compressor
135 switch
140 controller
145 wire harness
150 ESS
155 hose coupler
160 line
165 hose
170 tire
305 door facing seat tower
306 console facing seat tower
405 cover plate
410 seat base
502 floor
504 seat cavity
505 leg
510 web
512 crossmember fasteners
514 mount openings
515 leg fasteners
520 web fasteners
525 base fastener
602 base plate
605 elbow
610 outlet
615 air intakes
620 filters
625 crossmember plate
630 gap
635 switch cable
640 switch connector
705 electrical connectors
710 harness connector
805 nut
810 fitting
815 blade connectors
905 compressor surface
910 cover plate bend
915 cover plate edge
920 crossmember bend
925 crossmember edge
930 inner surface
935 flange bend
940 flange
945 flange edge
950 flange surface
955 coupling hole
960 switch cut-out
965 relief notch

1005 compressor mounting holes
1007 crossmember mounting holes
1010 base fastener holes
1015 web fastener holes
1020 relief hole
1025 protrusion
1030 wings
1035 flange holes
1105 compressor fasteners
1205 washer
1210 lock nut
1215 spacer
1305 plug
1310 ground wire
1315 positive wire
1320 ground lug
1325 positive lug
1330 fuse
1405 positive terminal
1410 positive nut
1505 ground point
1510 ground nut
1605 vehicle cabin
1610 door opening
1615 seat rail
1620 seat mount openings
1625 gasket

What is claimed is:

1. A kit, comprising:

an air compressor is configured to create pressurized gas;

a mounting bracket configured to mount the air compressor under a seat of a vehicle;

a hose coupler configured to detachably couple to a hose;

an air line configured to connect the hose coupler to the air compressor;

wherein the mounting bracket has a base;

wherein the base is configured to secure the compressor to the mounting bracket;

wherein the mounting bracket has a crossmember plate;

wherein the crossmember plate extends transverse to the base;

wherein the mounting bracket has a flange;

wherein the flange extends transverse from the crossmember plate; and wherein the crossmember plate and the flange each have mounting holes at opposing ends that coincide with locations of crossmember fastener openings in opposing seat towers.

2. The kit of claim 1, wherein the mounting bracket is configured to mount the air compressor to a crossmember located under the seat.

3. The kit of claim 2, wherein the mounting bracket defines one or more crossmember mounting holes configured to receive one or more crossmember fasteners that fasten the crossmember to the vehicle.

4. The kit of claim 3, wherein the crossmember mounting holes are positioned on the mounting bracket to match the locations where at least some of the crossmember fasteners fasten the crossmember to the vehicle.

5. The kit of claim 4, wherein the mounting bracket is configured to secure to the crossmember at two different planes to enhance security of the air compressor.

6. The kit of claim 4, wherein:

the mounting bracket has a base plate;

the air compressor is configured to mount to the base plate of the mounting bracket;

the mounting bracket has a crossmember plate;

the crossmember plate extends transversely from the base plate;

the mounting bracket has a flange;

the flange extends transversely from the crossmember plate; and the crossmember plate and the flange both have the crossmember mounting holes.

7. The kit of claim 1, further comprising:

wherein the mounting bracket has a base plate;

wherein the base plate defines one or more compressor mounting holes; and one or more compressor fasteners configured to be received in the compressor mounting holes to secure the air compressor to the base plate of the mounting bracket.

8. The kit of claim 1, wherein:

the mounting bracket has a base plate;

the mounting bracket has a cover plate;

the cover plate extends transverse to the base plate; and the hose coupler is mounted to the cover plate.

9. The kit of claim 8, further comprising:

a switch configured to turn the air compressor on and off; and wherein the switch is mounted to the cover plate.

10. The kit of claim 1, further comprising:

an elbow is-configured to connect the air compressor to the air line; and wherein the elbow is bent to facilitate mounting of the air compressor under the seat.

11. The kit of claim 1, further comprising:

a wire harness configured to supply electrical power from an Energy Storage System (ESS) of the vehicle to the air compressor.

12. The kit of claim 11, wherein the wire harness has a length that is sufficient to electrically connect the air compressor to the ESS when the ESS is located behind the seat where the air compressor is mounted.

13. The kit of claim 1, wherein the air compressor is a dual air compressor.

14. The kit of claim 1, wherein:

the mounting bracket has a flange;

the flange has mounting holes at opposing ends that coincide with locations of crossmember fastener openings in opposing seat towers; and the flange is configured to extend between the opposing seat towers.

15. The kit of claim 1, further comprising:

a wire harness configured to supply electrical power from an Energy Storage System (ESS) of the vehicle to the air compressor; and wherein the wire harness has a length that is sufficient to extend with a cabin of the vehicle to electrically connect the air compressor to the ESS when the ESS is located behind the seat where the air compressor is mounted.

16. The kit of claim 1, wherein the mounting bracket has a flange that is L-shaped.

17. A system, comprising:

an air compressor;

a mounting bracket configured to mount the air compressor under a seat of a vehicle;

wherein the mounting bracket is configured to mount the air compressor to a crossmember located under the seat;

wherein the crossmember extends between seat towers;

wherein the seat towers are configured to support the seat;

wherein the seat and the seat towers define a seat cavity;

wherein the mounting bracket mounts the air compressor inside the seat cavity;

wherein the crossmember is L-Shaped;

wherein the crossmember has a web and a leg;

wherein the leg extends transverse to the web;

wherein the mounting bracket has a base plate;

wherein the air compressor is mounted to the base plate of the mounting bracket;

wherein the mounting bracket has a crossmember plate;

wherein the crossmember plate extends transversely from the base plate;

wherein the mounting bracket has a flange;

wherein the flange extends transversely from the cross-member plate;

wherein the flange is secured to the leg of the crossmember; and wherein the crossmember plate is secured to the web of the crossmember.

18. The system of claim 17, wherein one or more crossmember fasteners originally installed by an Original Equipment Manufacturer (OEM) fasten the mounting bracket to the crossmember.

19. The system of claim 17, wherein the mounting bracket is secured to the crossmember located at the front of the seat to brace the air compressor during deceleration.

20. The system of claim 17, further comprising:

wherein the mounting bracket defines one or more crossmember mounting holes;

wherein the crossmember plate and the flange both have the crossmember mounting holes; and crossmember fasteners extending through the crossmember mounting holes to secure the mounting bracket to the crossmember.

21. The system of claim 17, further comprising:

wherein the mounting bracket has a cover plate;

wherein the cover plate extends transverse to the base plate;

wherein the cover plate faces a door opening when the mounting bracket is mounted;

wherein the cover plate covers a space between the seat towers to shield the air compressor;

a switch mounted to the cover plate;

wherein the switch is operatively connected to the air compressor;

wherein the switch faces the door opening;

a hose coupler mounted to the cover plate;

an air line connecting the hose coupler to the air compressor; and wherein the hose coupler faces the door opening to promote convenient hose connection.

22. The system of claim 21, further comprising:

an elbow connecting the air compressor to the air line; and wherein the elbow is bent to facilitate mounting of the air compressor under the seat.

23. The system of claim 18, further comprising:

wherein the seat is located inside a vehicle cabin of a vehicle with a floor;

wherein the vehicle has an Energy Storage System (ESS); and a wire harness electrically connecting the air compressor to the ESS without routing through a firewall of the vehicle.

24. The system of claim 23, wherein:

the ESS is stored under the floor of the vehicle cabin;

the ESS is stored under a passenger seat;

the passenger seat is a rear passenger seat;

the passenger seat is located on the driver side of the vehicle;

the wire harness extends within the vehicle cabin of the vehicle; and the wire harness extends in a rearward direction from the air compressor to the rear passenger seat.

25. The system of claim 24, wherein:

the ESS includes a battery;

the battery has a positive terminal and a negative terminal;

the wire harness includes a positive wire and a ground wire;

the positive wire connects to the positive terminal;

the vehicle has a ground point; and the ground wire connects to the ground point.

26. A kit, comprising:

an air compressor is configured to create pressurized gas;

a mounting bracket configured to mount the air compressor under a seat of a vehicle;

a hose coupler configured to detachably couple to a hose;

an air line configured to connect the hose coupler to the air compressor;

wherein the mounting bracket is configured to mount the air compressor to a crossmember located under the seat;

wherein the mounting bracket defines one or more crossmember mounting holes configured to receive one or more crossmember fasteners that fasten the crossmember to the vehicle;

wherein the crossmember mounting holes are positioned on the mounting bracket to match the locations where at least some of the crossmember fasteners fasten the crossmember to the vehicle; and wherein the mounting bracket is configured to secure to the crossmember at two different planes to enhance security of the air compressor.

27. The kit of claim 26, wherein:

the mounting bracket has a base plate;

the mounting bracket has a cover plate;

the cover plate extends transverse to the base plate; and the hose coupler is mounted to the cover plate.

28. The kit of claim 27, further comprising:

a switch configured to turn the air compressor on and off; and wherein the switch is mounted to the cover plate.

29. The kit of claim 26, further comprising:

a wire harness configured to supply electrical power from an Energy Storage System (ESS) of the vehicle to the air compressor.

30. The kit of claim 26, wherein the air compressor is a dual air compressor.

31. The kit of claim 26, wherein the mounting bracket has a flange that is L-shaped.

32. A kit, comprising:

an air compressor is configured to create pressurized gas;

a mounting bracket configured to mount the air compressor under a seat of a vehicle;

a hose coupler configured to detachably couple to a hose;

an air line configured to connect the hose coupler to the air compressor;

wherein the mounting bracket is configured to mount the air compressor to a crossmember located under the seat;

wherein the mounting bracket defines one or more crossmember mounting holes configured to receive one or more crossmember fasteners that fasten the crossmember to the vehicle;

wherein the crossmember mounting holes are positioned on the mounting bracket to match the locations where at least some of the crossmember fasteners fasten the crossmember to the vehicle;

wherein the mounting bracket has a base plate;

wherein the air compressor is configured to mount to the base plate of the mounting bracket;

wherein the mounting bracket has a crossmember plate;

wherein the crossmember plate extends transversely from the base plate;

wherein the mounting bracket has a flange;

wherein the flange extends transversely from the crossmember plate; and wherein the crossmember plate and the flange both have the crossmember mounting holes.

33. The kit of claim 32, further comprising:

wherein the mounting bracket has a cover plate;

wherein the cover plate extends transverse to the base plate;

wherein the hose coupler is mounted to the cover plate; and a switch is mounted to the cover plate.

34. The kit of claim 32, wherein the air compressor is a dual air compressor.

\* \* \* \* \*